(12) United States Patent
McDonald

(10) Patent No.: US 12,137,672 B2
(45) Date of Patent: Nov. 12, 2024

(54) FRAME FOR PORTABLE PANEL ASSEMBLY

(71) Applicant: Rawhide Portable Corral, Inc., Abilene, KS (US)

(72) Inventor: John L. McDonald, Abilene, KS (US)

(73) Assignee: Rawhide Portable Corral, Inc., Abilene, KS (US)

( * ) Notice: Subject to any disclaimer, the term of this patent is extended or adjusted under 35 U.S.C. 154(b) by 0 days.

(21) Appl. No.: 18/421,919

(22) Filed: Jan. 24, 2024

(65) Prior Publication Data

US 2024/0156050 A1 May 16, 2024

Related U.S. Application Data

(63) Continuation of application No. 18/181,736, filed on Mar. 10, 2023, now Pat. No. 11,997,990.

(60) Provisional application No. 63/383,137, filed on Nov. 10, 2022, provisional application No. 63/397,167, filed on Aug. 11, 2022.

(51) Int. Cl.
*A01K 3/00* (2006.01)

(52) U.S. Cl.
CPC .................................. *A01K 3/001* (2021.08)

(58) Field of Classification Search
CPC ........ A01K 3/001; A01K 3/00; A01K 1/0035; A01K 1/0613; E04H 17/18; B60P 3/04
See application file for complete search history.

(56) References Cited

U.S. PATENT DOCUMENTS

| | | |
|---|---|---|
| 256,661 A | 4/1882 | Tarragon |
| 3,861,084 A | 1/1975 | Ford |
| 3,921,585 A | 11/1975 | Hall |
| 4,537,151 A | 8/1985 | Bolton |
| 4,619,223 A | 10/1986 | Koehn |
| 4,821,679 A | 4/1989 | Hackert |
| 4,829,936 A | 5/1989 | Mollhagen |
| 4,924,813 A | 5/1990 | Bixler et al. |
| 4,960,074 A | 10/1990 | Wilson |
| 5,115,763 A | 5/1992 | Wilson |
| RE33,959 E | 6/1992 | Mollhagen |

(Continued)

FOREIGN PATENT DOCUMENTS

GB    2531156 A    4/2016

OTHER PUBLICATIONS

Office Action in co-pending U.S. Appl. No. 18/181,722, dated May 24, 2023.

(Continued)

*Primary Examiner* — Trinh T Nguyen
(74) *Attorney, Agent, or Firm* — AVEK IP, LLC; Randall Wayne Schwartz

(57) ABSTRACT

A portable livestock corral is configured to be operably attached to a vehicle for advancement in a forward direction. The portable livestock corral includes a wheeled chassis and opposed sets of corral panels. The wheeled chassis includes an elongated corral frame and a ground-engaging transport wheel operable to support the corral frame above ground. The corral frame includes a spine extending longitudinally along the forward direction and at least partly defining opposed storage areas to receive corresponding corral panels, with the transport wheel being longitudinally spaced from the storage areas. The corral panels are positioned to extend longitudinally along respective sides of the spine in a stored condition.

20 Claims, 22 Drawing Sheets

(56) References Cited

U.S. PATENT DOCUMENTS

| | | | |
|---|---|---|---|
| 5,237,960 | A | 8/1993 | Wilson |
| 5,381,757 | A | 1/1995 | Putney |
| 6,067,940 | A | 5/2000 | Holder |
| 7,216,605 | B2 | 5/2007 | Cupps |
| 9,392,754 | B1 | 7/2016 | Summers et al. |
| 10,085,438 | B1 | 10/2018 | Dismang |
| 11,547,083 | B2 | 1/2023 | Mcdonald |
| 2008/0296548 | A1 | 12/2008 | Mcdonald |
| 2013/0221305 | A1 | 8/2013 | Dilworth et al. |
| 2014/0371971 | A1 | 12/2014 | Welch |
| 2015/0075442 | A1 | 3/2015 | Wilson |
| 2015/0250136 | A1 | 9/2015 | Wilson |
| 2015/0334987 | A1 | 11/2015 | Schwartz et al. |
| 2018/0035637 | A1 | 2/2018 | Wilson |
| 2020/0040600 | A1 | 2/2020 | Mollhagen |
| 2021/0360897 | A1 | 11/2021 | Wilson |

OTHER PUBLICATIONS

Office Action in co-pending U.S. Appl. No. 18/181,736, dated Sep. 21, 2023.
Office Action in now patented U.S. Appl. No. 18/181,743, dated May 17, 2023.

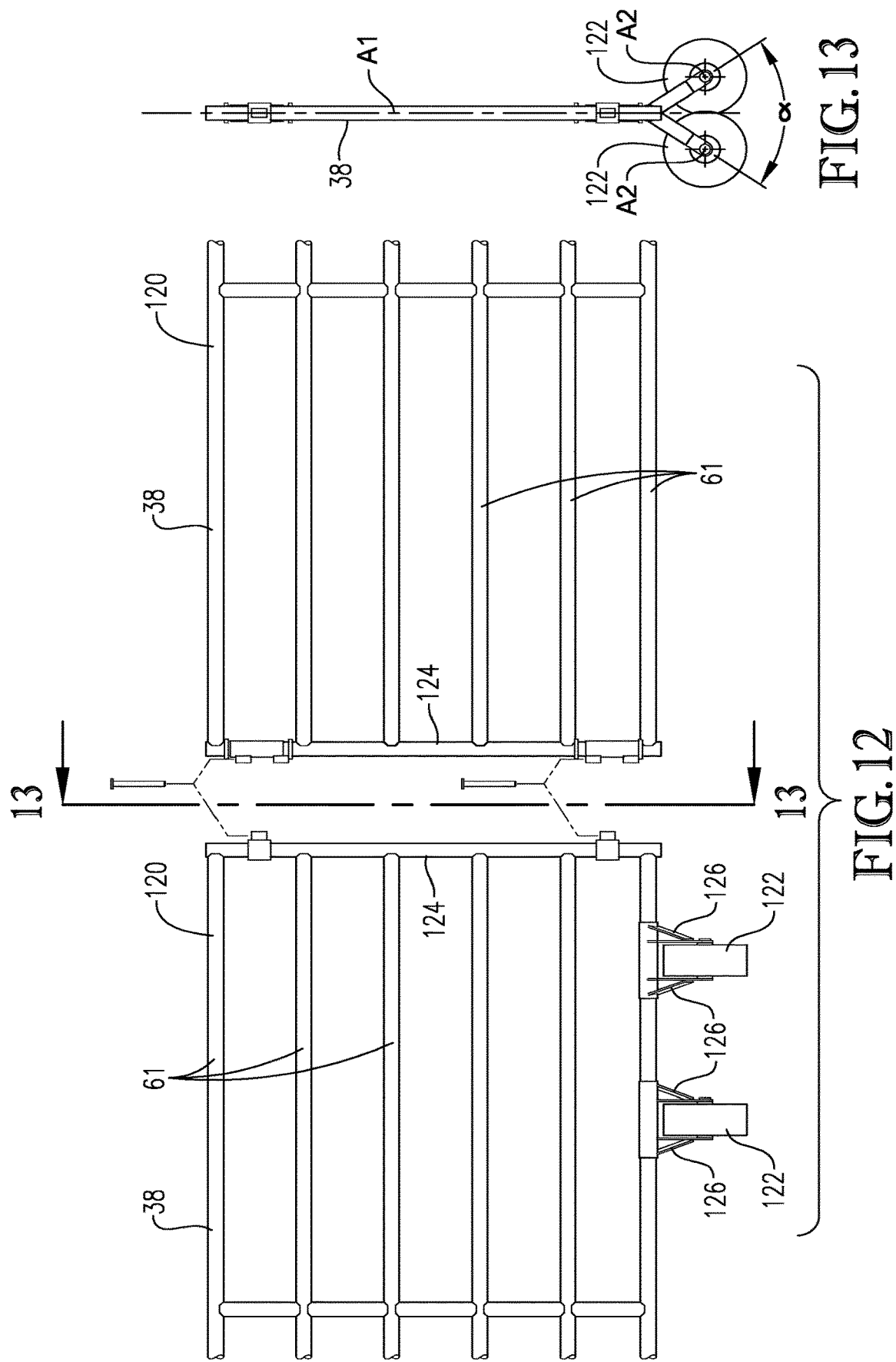

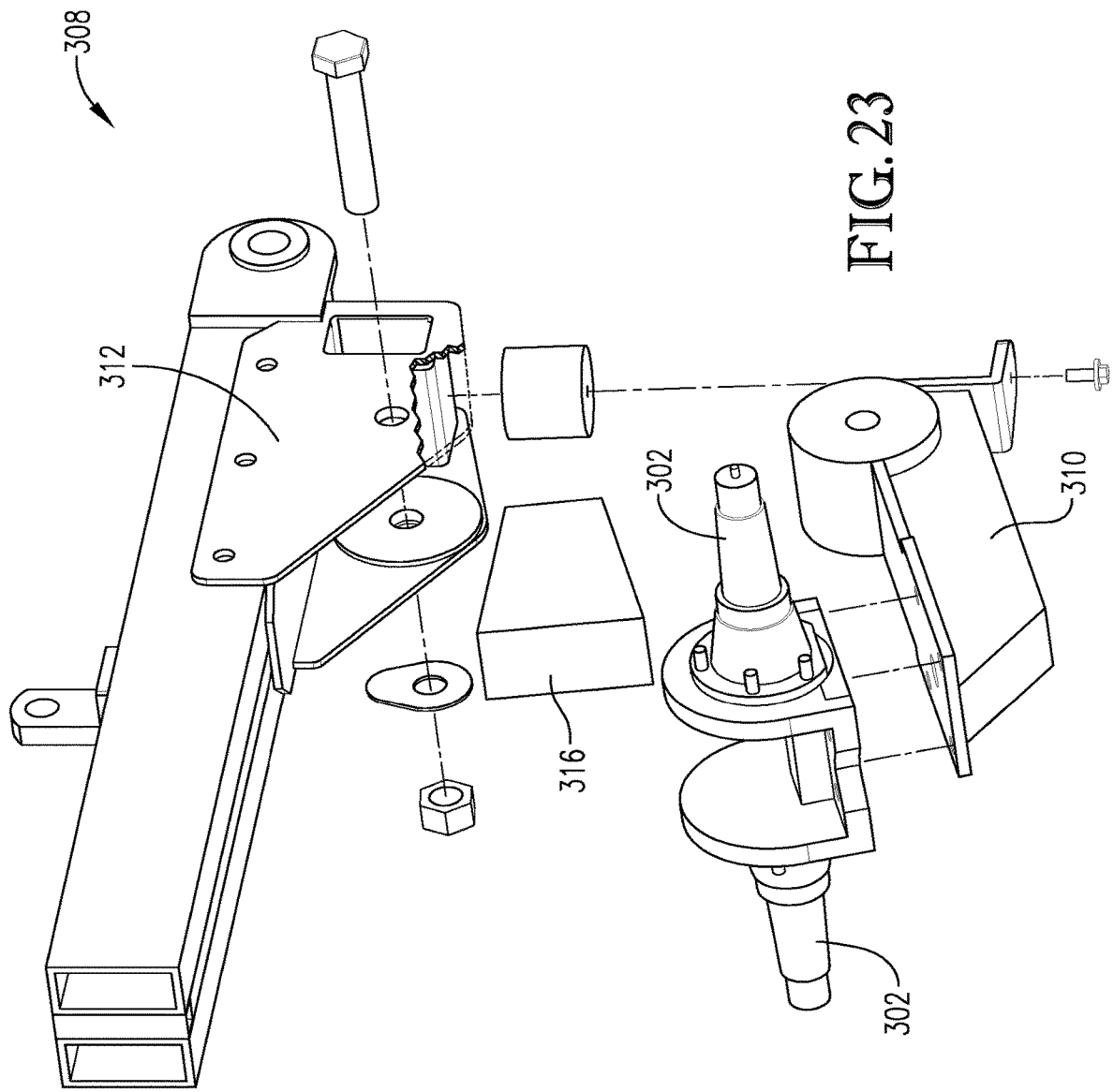

FRAME FOR PORTABLE PANEL ASSEMBLY

CROSS-REFERENCE TO RELATED APPLICATIONS

This application is a continuation of U.S. Nonprovisional application Ser. No. 18/181,736, entitled PORTABLE CORRAL WITH SHIFTABLE RACK TO SUPPORT PANELS, filed Mar. 10, 2023, which application claims the priority benefit of U.S. Provisional Application Ser. No. 63/397,167, filed Aug. 11, 2022, entitled PORTABLE CORRAL WITH SWINGABLE PANEL RACKS AND ANGLED PANEL WHEELS, and U.S. Provisional Application Ser. No. 63/383,137, filed Nov. 10, 2022, entitled PORTABLE CORRAL WITH SWINGABLE PANEL RACKS AND ANGLED PANEL WHEELS, each of which is hereby incorporated in its entirety by reference herein.

BACKGROUND

1. Field

The present disclosure relates generally to corral and panel structures constructed to hold livestock, such as cattle or horses. More specifically, embodiments of the present disclosure concern a portable livestock corral.

2. Description of Related Art

Conventional livestock corrals generally include one or more pens for holding livestock. Corrals traditionally comprise stationary and permanent fencing structure. The fencing structure may include several individual fence panels, which may be rigid or flexible and cooperatively define the perimeter boundary of the pen(s).

Portable corral systems are also known in the art and may include a plurality of panels that can be selectively erected or collapsed for transport. In some known applications, portable corrals may include panels that may be loaded or otherwise supported on a wheeled frame or trailer for transport. For instance, some prior art portable corrals include a purpose-built wheeled support frame that may support panels for transport while also serving as part of the corral during use. The wheeled support frame may be hitched to a truck, tractor, or other vehicle for transport and then unhitched when the corral is deployed. Panels may be extended (or unfolded) from the frame and arranged in various configurations to form a desired pen arrangement. Panels may include a wheel to assist the user with moving the panels to the desired location and orientation to form a desired corral configuration.

However, existing portable corral systems suffer some deficiencies. For example, the wheel systems on existing portable corrals can be unstable, which can cause the panels to twist when extending and retracting. Additionally, existing frames are limited in the number of panels that can be held when retracted, thereby limiting the overall size of the deployed corral. Thus, there is a need for an improved portable corral system.

This background discussion is intended to provide information related to the present disclosure which is not necessarily prior art.

SUMMARY

The following brief summary is provided to indicate the nature of the subject matter disclosed herein. While certain aspects of the present disclosure are described below, the summary is not intended to limit the scope of the present invention.

Embodiments of the present disclosure provide a portable livestock corral that does not suffer from the problems and limitations of the prior art livestock corrals set forth above.

An aspect of the present disclosure concerns a portable livestock corral configured to be operably attached to a vehicle for advancement in a forward direction. The portable livestock corral broadly includes a wheeled chassis and opposed sets of corral panels. The wheeled chassis includes an elongated corral frame and a ground-engaging transport wheel operable to support the corral frame above ground. The corral frame includes a spine extending longitudinally along the forward direction and at least partly defining opposed storage areas to receive corresponding corral panels, with the transport wheel being longitudinally spaced from the storage areas. The opposed sets of corral panels are positioned to extend longitudinally along respective sides of the spine in a stored condition, with the corral frame configured to removably support the opposed sets of corral panels when the corral is advanced in the forward direction by the vehicle. The opposed sets of corral panels are each shiftable between the stored condition, in which each of the sets of corral panels is supported at least partly within a respective storage area by the wheeled chassis for transport therewith, and a deployed condition, in which one or more corral panels of each of the opposed sets extend outside of the respective storage area to form an enclosed livestock pen.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 12 is a fragmentary elevation view of the set of corral panels shown in FIG. 11, depicting components that form a swivel joint used to connect adjacent corral panels;

FIG. 13 is a cross-sectional view of the set of corral panels taken along line 13-13 in FIG. 12;

Figure 20:
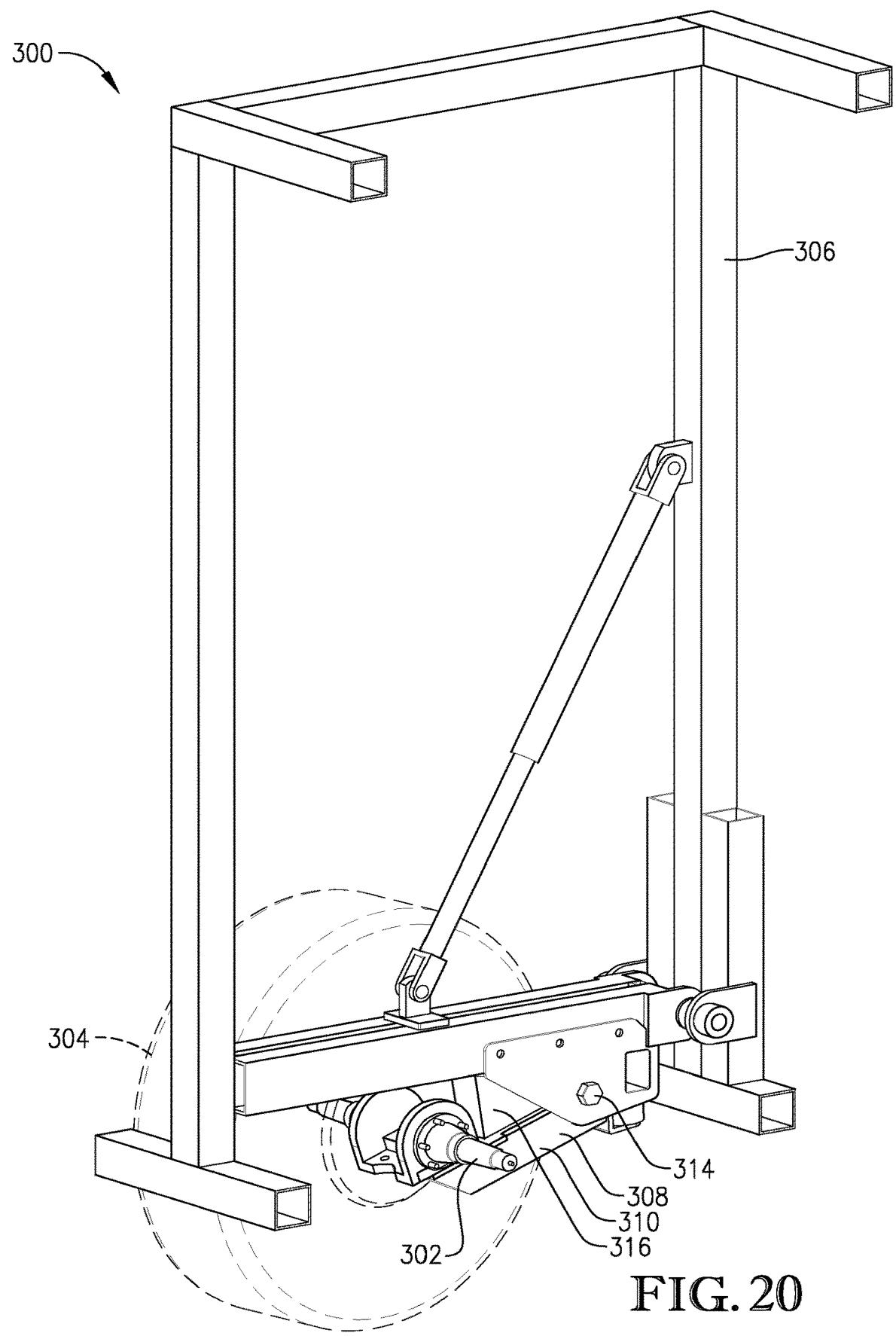
Figure 21:
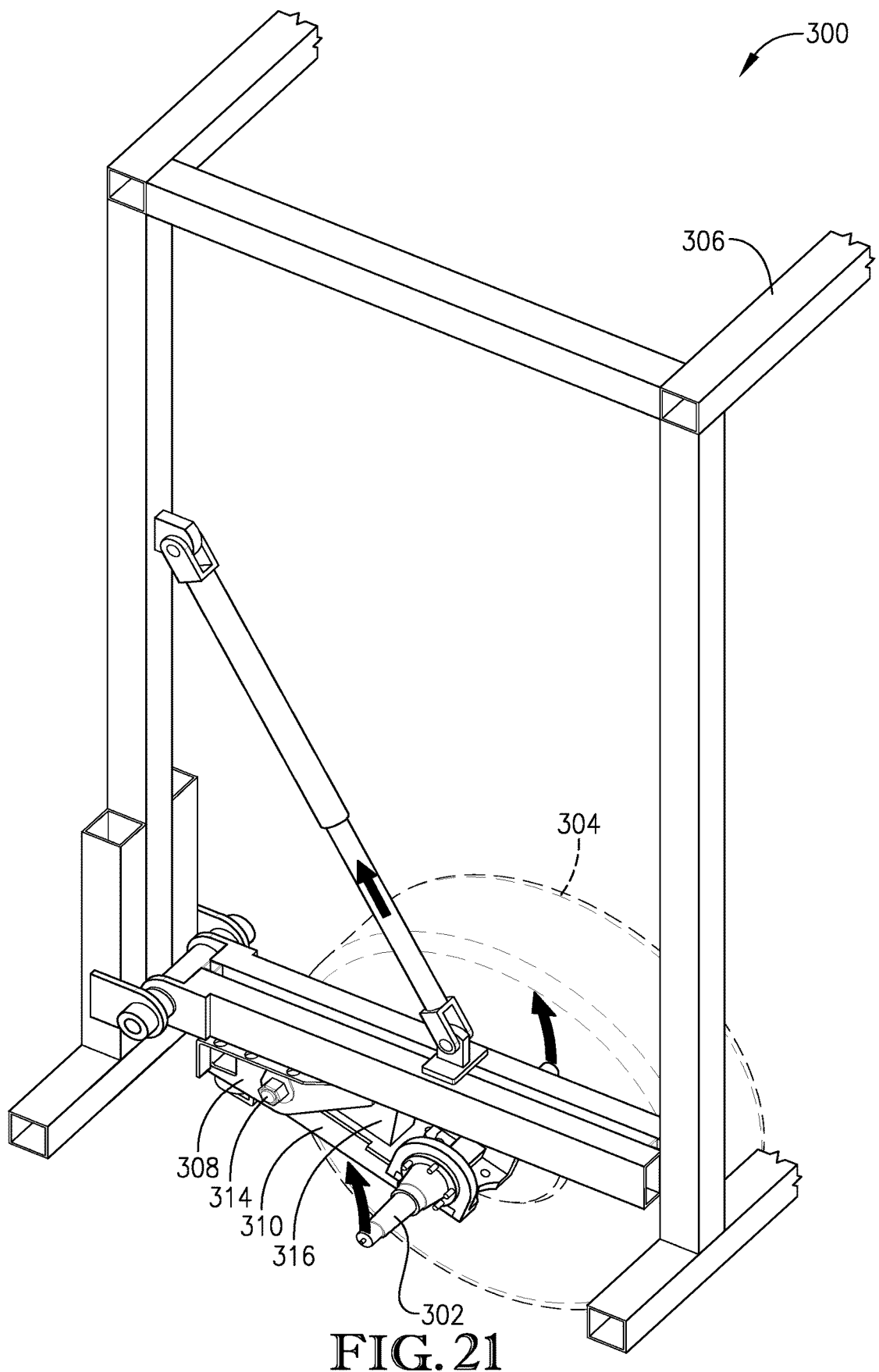
Figure 22:
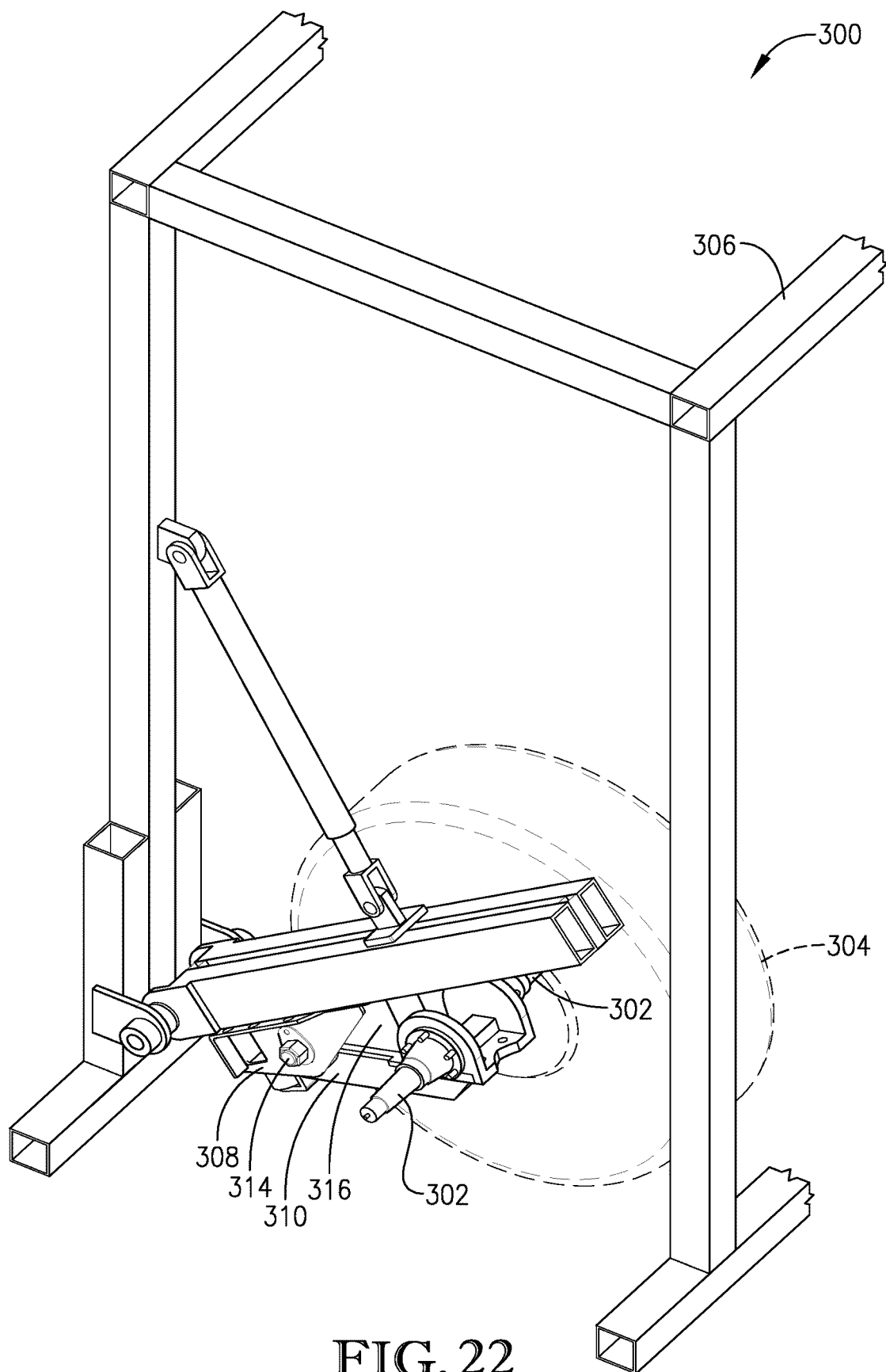

FIGS. 20-22 are fragmentary perspective views of a portable livestock corral constructed in accordance with a third preferred embodiment of the present invention, and depicting an alternative suspension that adjustably supports an aft section of the corral frame and includes an alternative torsion assembly; and FIG. 23 is an exploded perspective view of the alternative torsion assembly shown in FIGS. 20-22.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE EXEMPLARY EMBODIMENTS

The following detailed description of embodiments of the invention references the accompanying figures. The embodiments are intended to describe aspects of the invention in sufficient detail to enable those with ordinary skill in the art to practice the invention. The embodiments of the disclosure are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

Turning initially to FIGS. 1-5, a portable livestock corral 30 is operable to be selectively deployed for holding livestock (not shown), such as cattle or horses. The corral 30 may be deployed to form one or more pens 32 (see FIG. 5) configured to hold livestock associated with various purposes, such as gathering, sorting, observing, treating, feeding, and/or transporting livestock.

Portable livestock corral 30 is also configured to be attached to a powered vehicle (not shown) for transportation. In the usual manner, corral 30 is attached behind a powered vehicle, such as a truck, primarily for advancement in a forward direction F so that the portable livestock corral 30 may be transported from one location to another.

The portable livestock corral 30 broadly includes a wheeled chassis 34, opposed inboard sets 36 of corral panels 38, and opposed outboard sets 40 of corral panels 38. As explained below, wheeled chassis 34 is operable to support the opposed sets 36,40 of corral panels 38 during use, particularly during transportation of the portable livestock corral 30.

In the illustrated embodiment, wheeled chassis 34 preferably includes an elongated corral frame 42 and pairs of ground-engaging transport wheels 44. Transport wheels 44 are independently shiftable relative to the corral frame 42 and are operable to support the corral frame 42 above ground.

Turning to FIGS. 6-10, the depicted corral frame 42 preferably includes a spine 46 and spaced apart forward and aft sections 48,50 connected by the spine 46. Corral frame also includes a tongue 52 attached to and extending forwardly of the forward section 48. In the usual manner, tongue 52 has a hitch configured to be removably attached to the powered vehicle so that the vehicle may tow the corral 30 from one location to another.

Spine 46 extends longitudinally along the forward direction. The spine 46 preferably includes side-by-side structural walls 54 that are spaced apart and fixed relative to each other by intermediate spacers 56. Each wall 54 includes an arrangement of upper and lower tubular beams 58,60, tubular cross members 61, and tubular uprights 62 welded to form a monolithic and rigid weldment (see FIGS. 6 and 7). Beams 58,60 preferably comprise tubular members. Walls 54 cooperatively define openings 64,66 that permit access to pens 32 (particularly movement between pens 32) and may be selectively opened and closed by gates 68,70, which are configured to be swung between an open position (e.g., see FIG. 7) and a closed position (see FIG. 6). The spine 46 preferably defines a maximum spine width dimension D1 (see FIG. 10) that is less than about twelve inches (12"). In one or more embodiments, the spine width dimension D1 may range from about four inches (4") to about eighteen inches (18") and, more preferably, may range from about six inches (6") to about twelve inches (12"). Most preferably, the spine width dimension D1 is about nine inches (9"). However, it is within the ambit of certain aspects of the present invention for the spine to be alternatively sized and/or configured. For instance, the spine width dimension may fall outside of the exemplary dimensions listed above.

Forward and aft sections 48,50 also preferably comprise tubular members 63 fixed relative to one another to form a rigid weldment. Forward and aft sections 48,50 are also fixed to the spine 46 at joints that are bolstered by angled gussets 72.

The forward and aft sections 48,50 cooperate with the spine 46 to define opposed storage areas 74 (see FIG. 4) configured to receive corresponding corral panels 38. The illustrated transport wheels 44 are associated with the aft section 50 and spaced rearwardly of the storage areas 74.

The forward and aft sections 48,50 each extend outboard of the spine 46 in opposite lateral directions so that the spine 46 and the forward and aft sections 48,50 cooperatively define the opposed storage areas 74. Furthermore, forward and aft sections 48,50 each present opposite outboard margins 76 (see FIG. 4) to which the sets 36,40 of corral panels 38 are pivotally attached. It is also within the scope of certain aspects of the present invention for one or both of the forward and aft sections to be alternatively configured. For at least some aspects of the present invention, the corral frame may include one or more alternative storage areas to receive corral panels. For instance, a storage area may be alternatively defined by one or more components of the corral frame.

Figure 14:
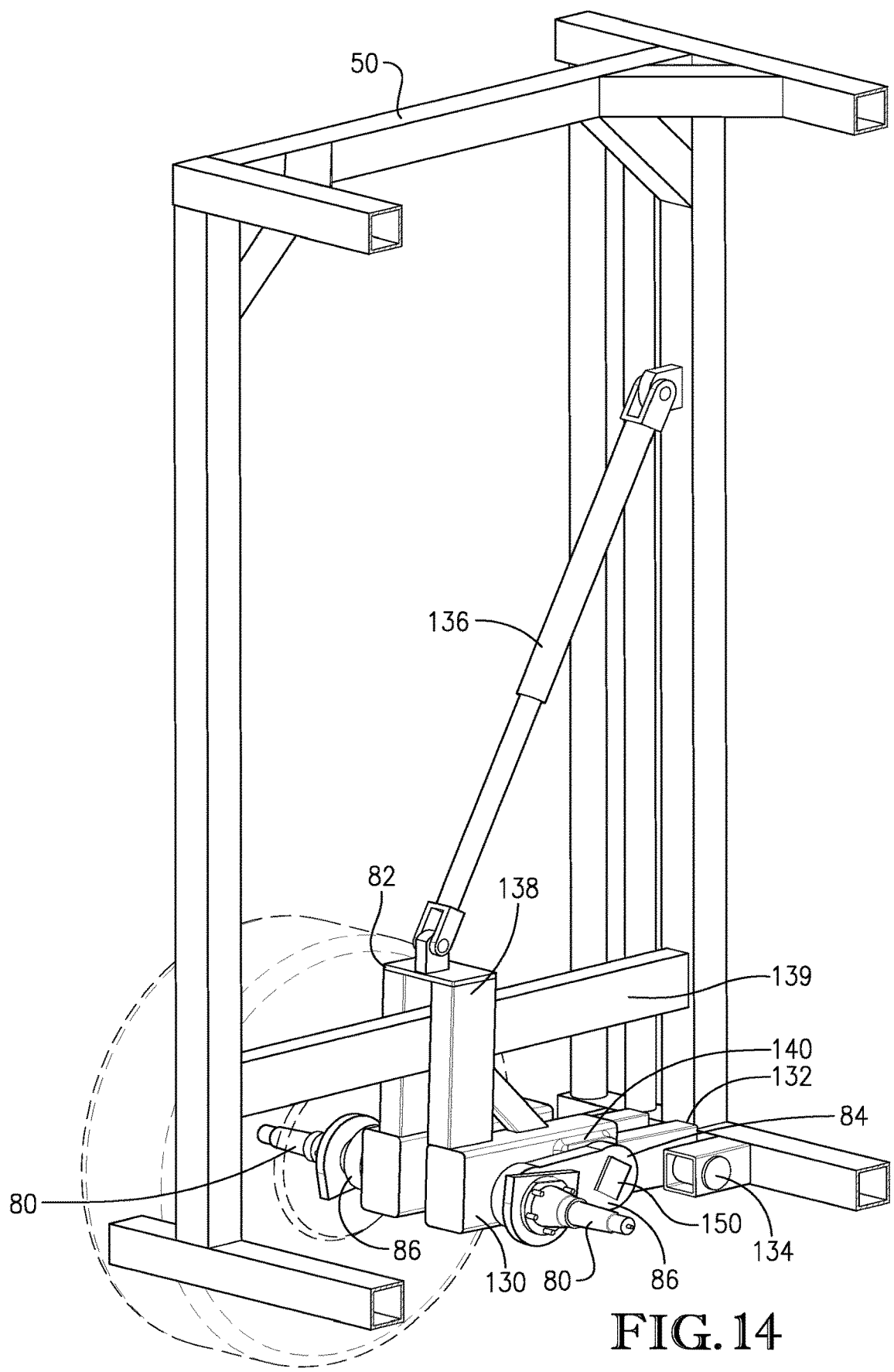
FIGS. 14-16 are fragmentary views of the portable livestock corral shown in FIGS. 1-13, showing a suspension that adjustably supports an aft section of the corral frame, with the suspension including a swing arm, torsion assembly supported on the swing arm, spindles, and transport wheels.
Figure 15A:
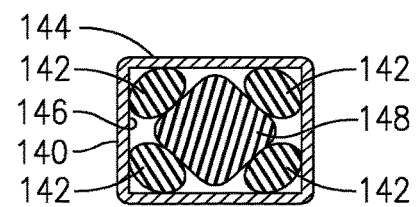
Figure 15:
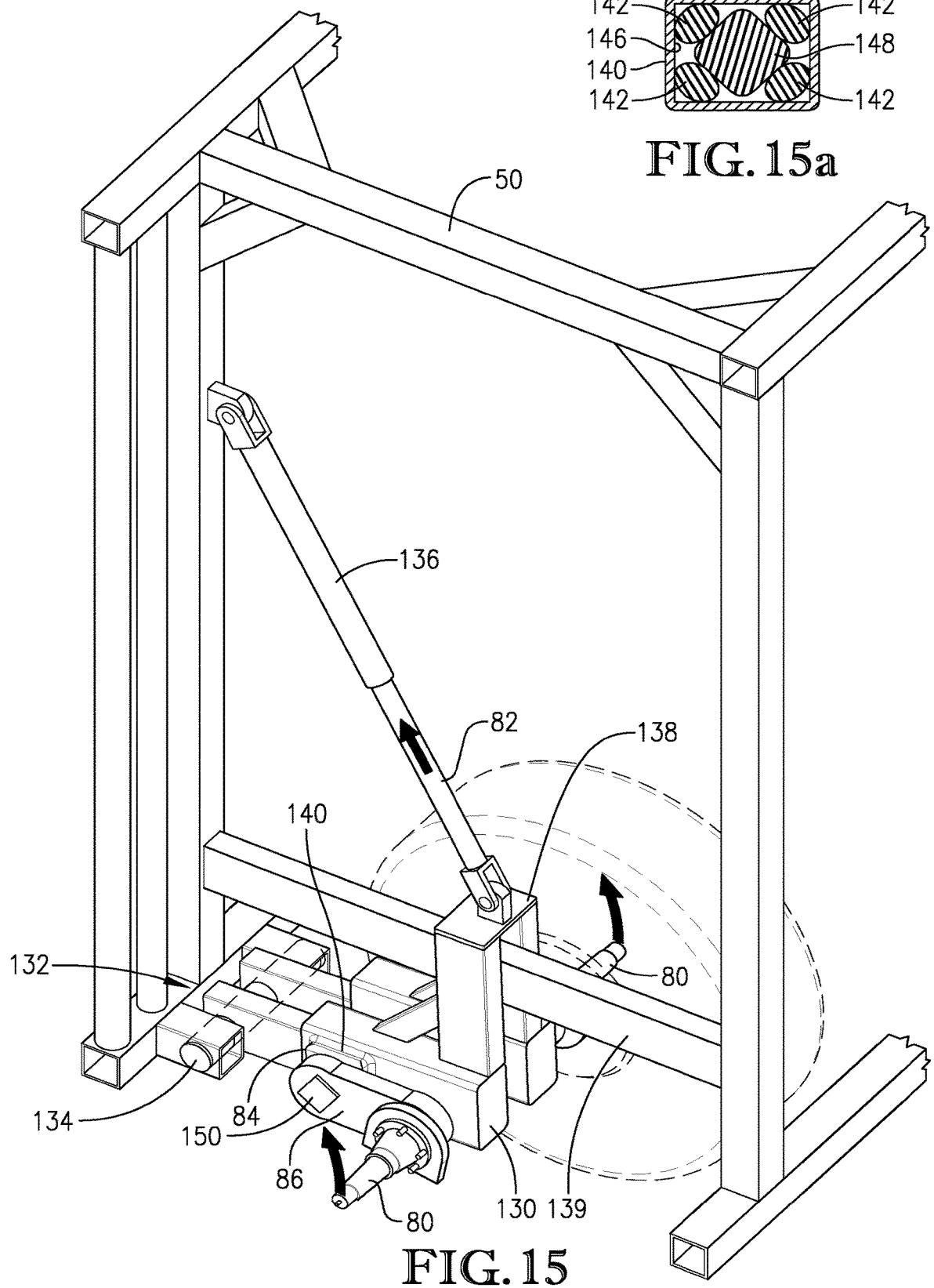
Figure 16:
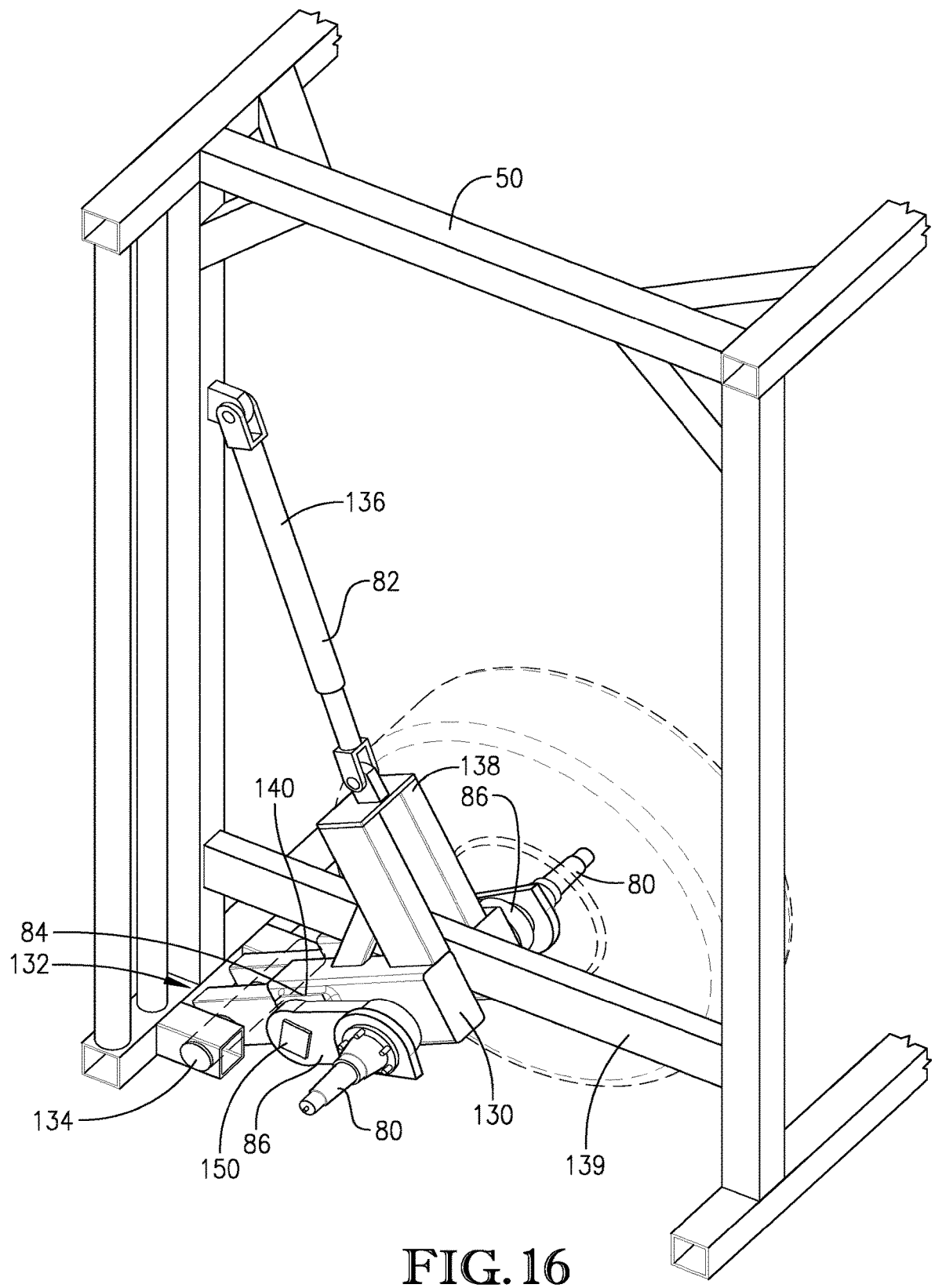

The wheeled chassis 34 further includes two pairs of spindles 80 and two suspensions 82 (see FIGS. 14-16). In the usual manner, spindles 80 rotatably receive the transport wheels 44. The suspension 82 is configured to shiftably support the spindles 80 and transport wheels 44 relative to the corral frame 42.

In the illustrated embodiment, suspension 82 includes a torsion assembly 84 with pivotal torsion arms 86 attached relative to the spindles 80. As will be explained, part of the torsion assembly 84 is configured to resiliently flex to permit shifting of the torsion arms 86 and the transport wheels 44.

Referring again to FIGS. 6-10, wheeled chassis 34 preferably also includes start panels 88 and shiftable racks 90,92. Start panel 88 includes a tubular panel structure 94 with tubular cross members 61 (see FIG. 8). Panel structure 94 also defines an opening 96. An access gate 98 is pivotally supported by a tubular upright 62 for receipt by the opening 96.

Start panel 88 also supports a shiftable rack 90, which includes upper and lower rack arms 100 pivotally supported by the upright 62. Rack arms 100 each preferably include a horizontal arm 102 and a gusset 104 (see FIGS. 8 and 9). Preferably, rack arms 100 are located between respective pairs of adjacent cross members 61, which permits rack arms 100 to be swung independently from one side of the panel structure 94 to the other side of the panel structure 94. Although the depicted rack arms 100 are detached from one another and independently swingable, one or more elements of the shiftable rack may be alternatively configured and/or positioned.

Figure 9:
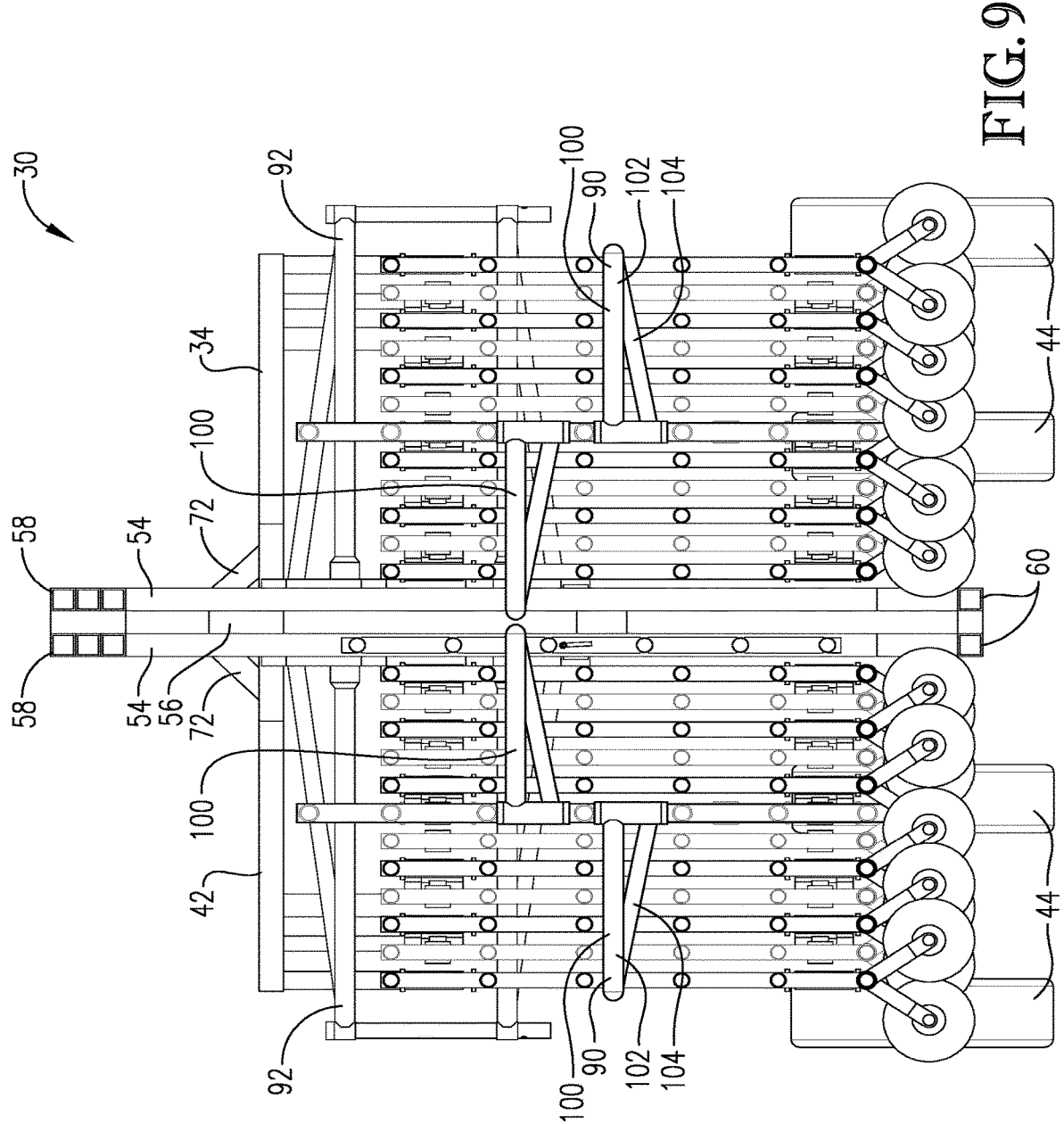
FIG. 9 is a cross-sectional view of the portable livestock corral taken along line 9-9 in FIG. 3.

In use, the rack arms 100 of each rack 90 are preferably arranged so as to extend in opposite directions to support respective sets 36,40 (see FIG. 9). It is also within the scope of the present invention for rack arms to be alternatively arranged for supporting one or more panels. For instance, the rack arms may be located on the same side of the start panel to engage a corresponding set of panels. In such an alternative arrangement, the shiftable rack may have rack arms with outboard ends removably attached to one another with a rigid connection device (such as a pin) or a flexible connection device (such as a chain or wire rope). Thus, shiftable rack 90 is configured to removably engage and support at least one of the sets 36,40 of corral panels 38 in the stored condition.

Figure 1:
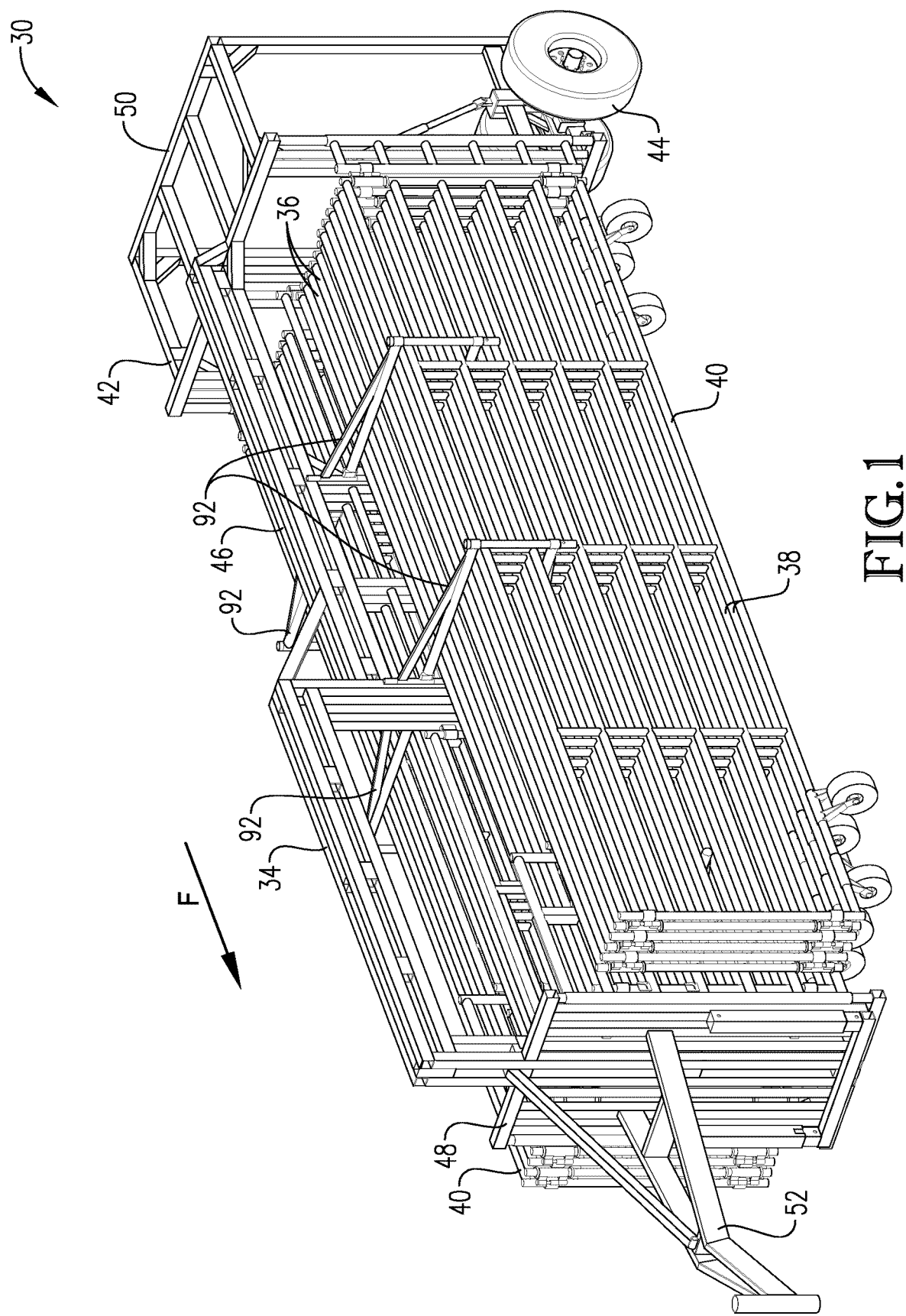
FIG. 1 is a front perspective view of a portable livestock corral constructed in accordance with a preferred embodiment of the present invention, with the corral including a wheeled chassis and inboard and outboard sets of corral panels supported on the wheel chassis in a stored condition.
Figure 2:
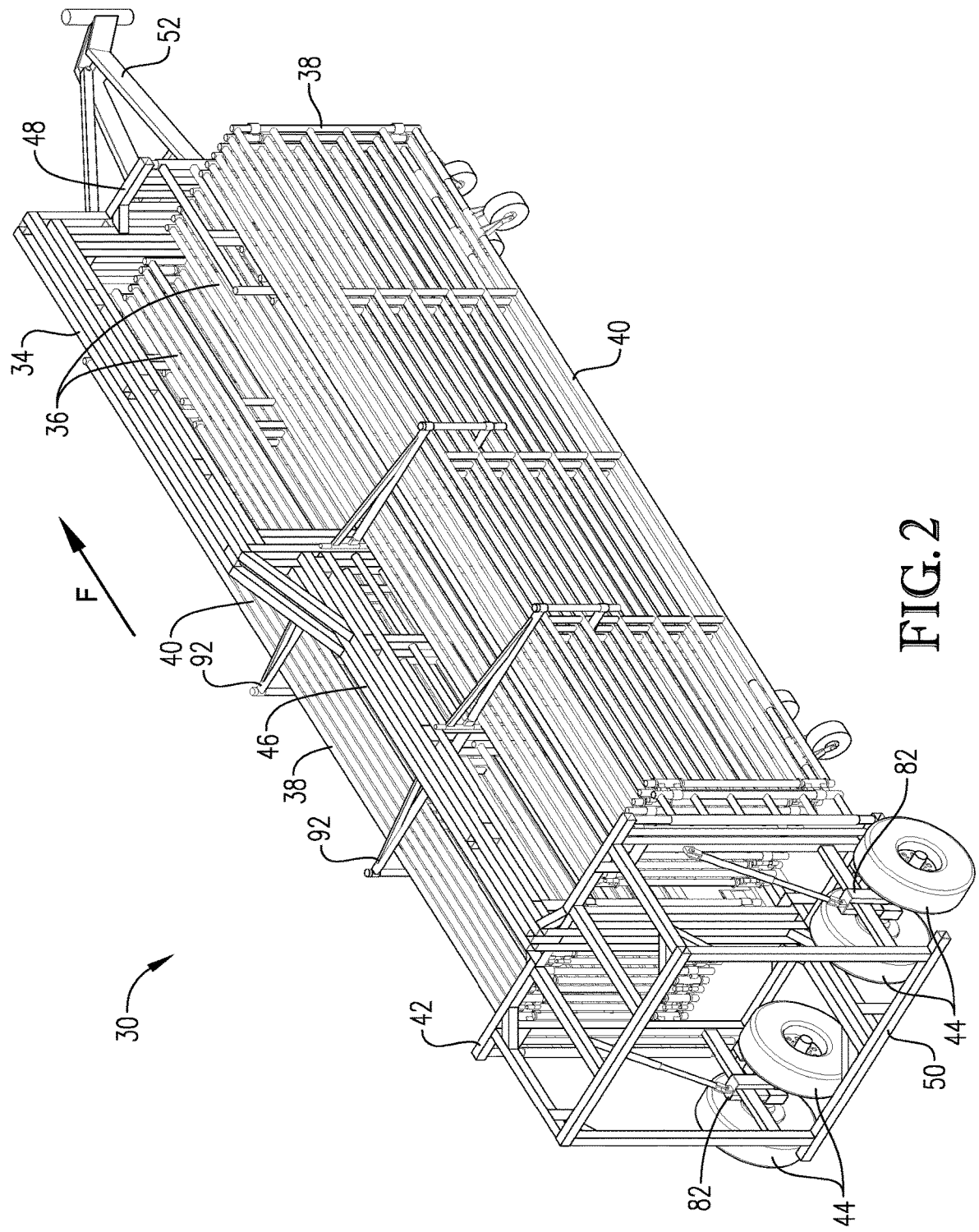
FIG. 2 is a rear perspective view of the portable livestock corral shown in FIG. 1.
Figure 3:
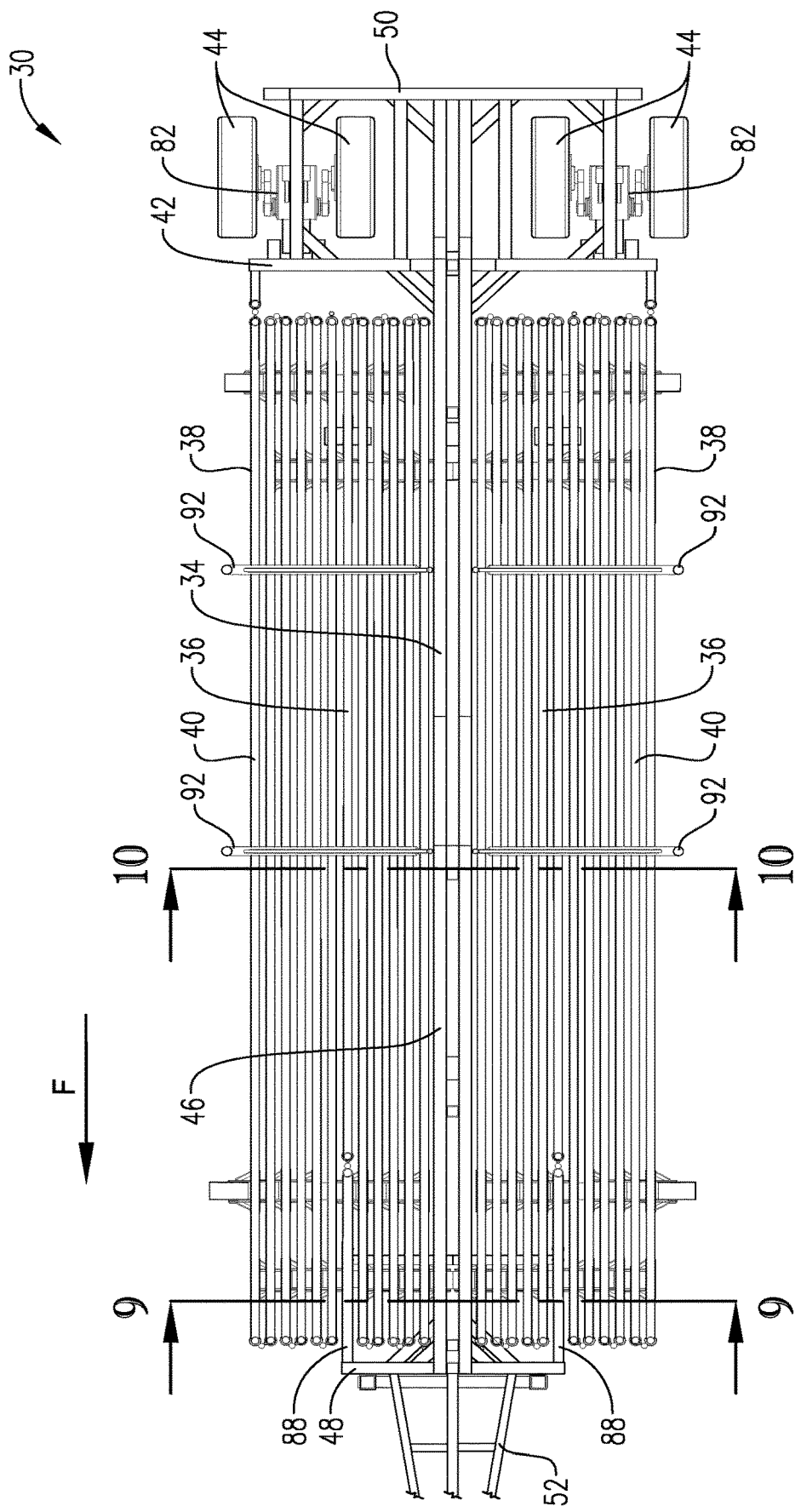
FIG. 3 is a fragmentary top view of the portable livestock corral shown in FIGS. 1 and 2.
Figure 4:
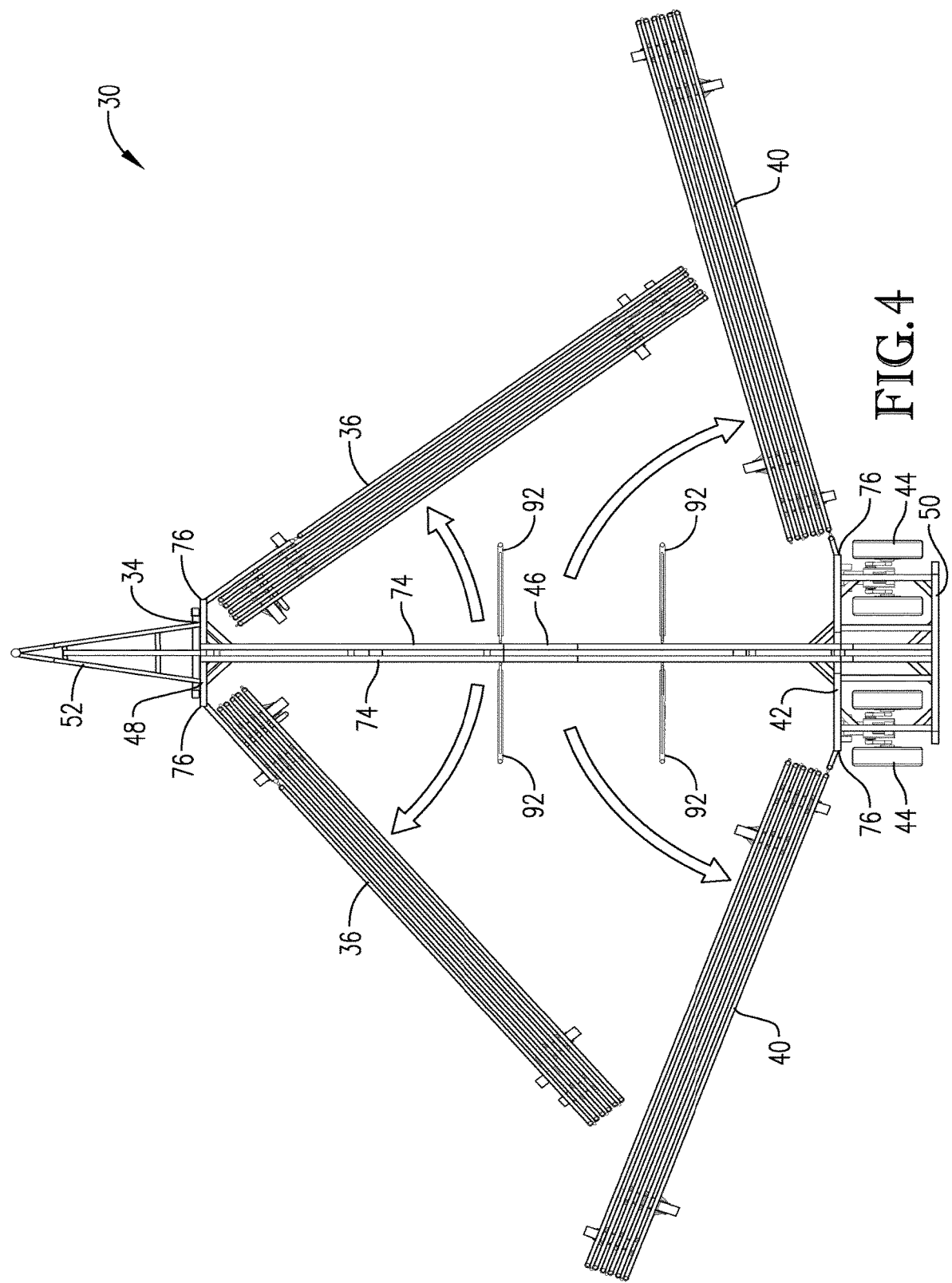
FIG. 4 is a top view of the portable livestock corral similar to FIG. 3, but showing inboard and outboard sets of corral panels swung in an outboard direction to move the corral panels out of the stored condition.
Figure 10:
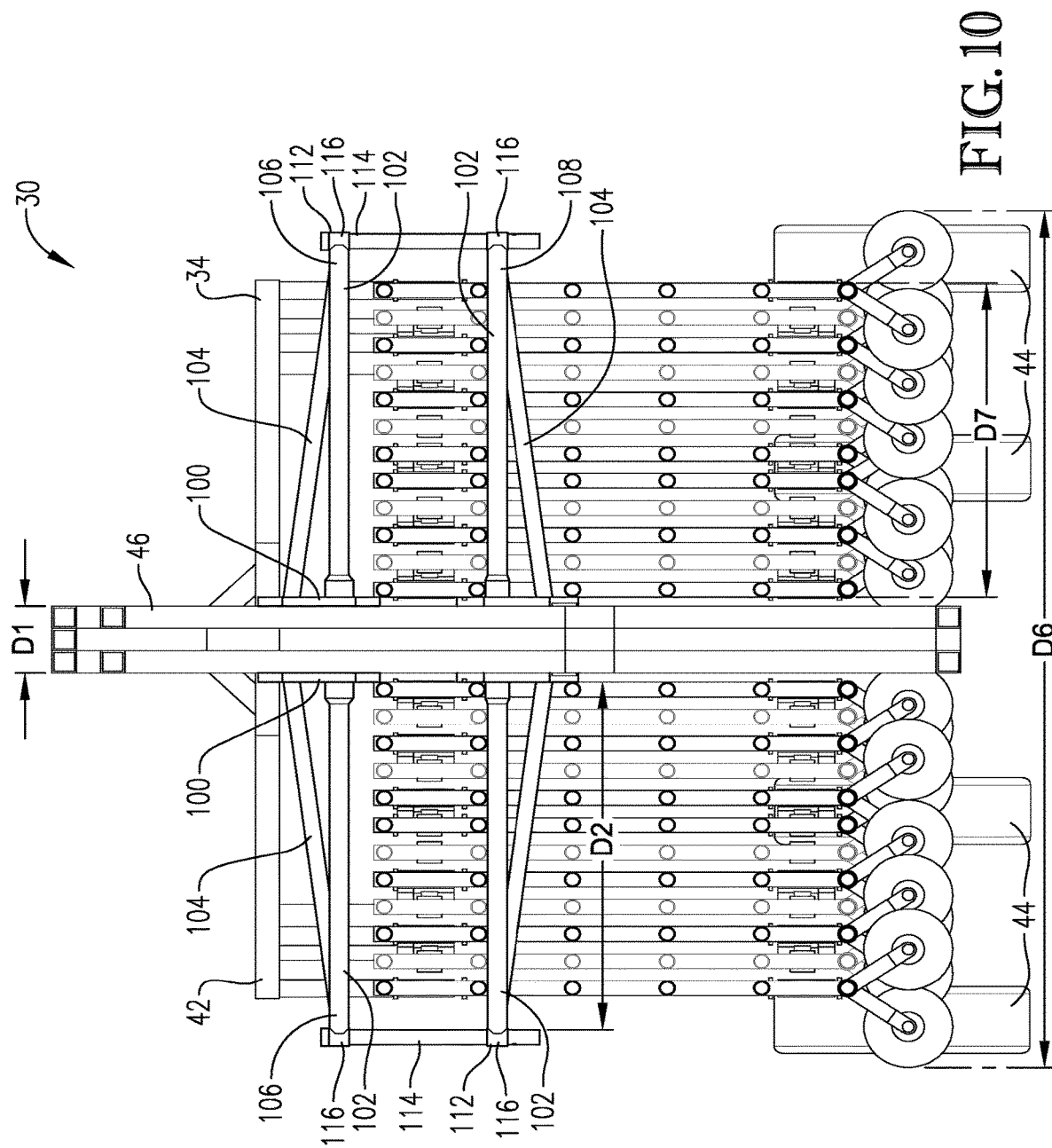
FIG. 10 is a cross-sectional view of the portable livestock corral taken along line 10-10 in FIG. 3.

Similarly, shiftable racks 92 are supported by the corral frame 42 and configured to removably engage and support at least one of the sets 36,40 of corral panels 38 in the stored condition (see FIGS. 1, 2, and 10). Each shiftable rack 92 includes upper and lower rack arms 106,108 receiving therebetween portions of at least one set 36,40 of corral panels 38 in the stored condition. Preferably, shiftable racks 90,92 engage cross members of at least one set 36,40 of corral panels 38. Shiftable rack 92 is preferably configured to restrict lateral movement of corral panels 38 out of engagement with the shiftable rack 92.

The depicted upper and lower rack arms 106,108 are pivotally attached to the corral frame 42 at respective rack pivot joints 110 (see FIG. 7) and have unsupported ends positioned outboard of the rack pivot joints 110 in the stored condition. The rack pivot joints 110 preferably permit the upper and lower rack arms 106,108 to pivot independently of one another. Although rack arms 106,108 are preferably connected to the spine 46 via rack pivot joints 110, one or more rack arms may be shiftably attached to relative to another component of the corral frame. It is also within the scope of certain aspects of the present invention for one or more rack arms to be shiftably supported by one or more swingable panels (such as a corral panel 38 or a start panel 88) or one or more gates (such as gates 68,70).

Referring to FIG. 10, upper and lower rack arms 106,108 are preferably spaced vertically and removably connected relative to one another by a connection joint 112 adjacent the unsupported ends. Connection joint 112 cooperates with the upper and lower rack arms 106,108 to restrict relative movement between the upper and lower rack arms 106,108.

The illustrated upper and lower rack arms 106,108 each include a tubular horizontal arm 102 and a gusset 104. Gusset 104 of the upper rack arm 106 is located above the horizontal arm 102 of the upper rack arm 106, while the gusset 104 of the lower rack arm 108 is located below the horizontal arm 102 of the lower rack arm 108. Preferably, horizontal arms 102 of the upper and lower rack arms 106,108 are substantially parallel to one another.

The shiftable rack 92 also preferably includes an upright connector pin 114 that removably engages the upper and lower rack arms 106,108 to form the connection joint 112. In particular, rack arms include fixed sleeves 116 adjacent the unsupported ends. Connector pin 114 is slidably received by the fixed sleeves 116 so that the connector pin 114 and fixed sleeves 116 cooperatively restrict relative movement between the upper and lower rack arms 106,108. Preferably, shiftable rack defines a lateral rack storage length dimension D2 that ranges from about thirty-six inches (36") to about sixty inches (60"). It is within the scope of certain aspects of the present invention for the shiftable rack to be alternatively sized and/or configured. For instance, the lateral rack storage length dimension may fall outside of the exemplary dimensions listed above.

Figure 11:
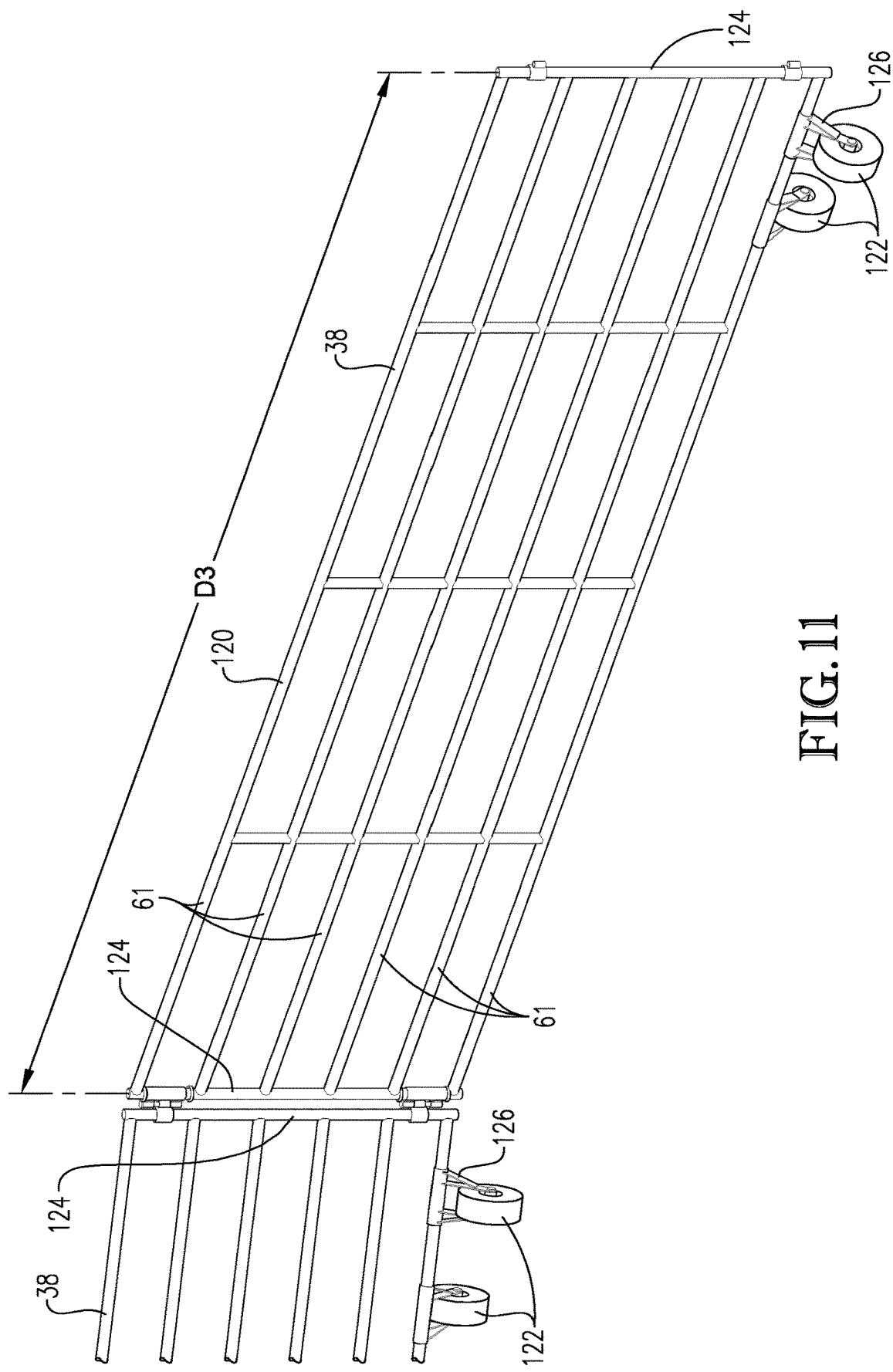
FIG. 11 is a fragmentary perspective view of one set of corral panels shown in FIGS. 1-10, depicting panel frames supported by panel wheels for swinging movement along the ground.

Turning to FIGS. 11-13, corral panels 38 each include multiple laterally-extending rows of tubular cross members 61. The corral panels 38 are configured so that rack arms 100,106,108 are spaced to receive corresponding rows of cross members 61 therebetween in the stored condition (see FIGS. 9 and 10).

Each of the inboard and outboard sets 36,40 of corral panels 38 preferably include a series of corral panels 38 pivotally attached to one another in series. The series of corral panels 38 are preferably configured to be folded into and out of at least partial registration with one another.

The corral panels 38 each define a panel length dimension D3 (see FIG. 11) that is preferably at least about eighteen feet. In one or more embodiments, panel length dimension D3 may range from about eighteen feet (18') to about twenty-four feet (24'). It is also within the ambit of certain aspects of the present invention for the panel length of one or more corral panels to fall outside of the above-listed range.

Each corral panel 38 preferably comprises a wheeled corral panel with a tubular panel frame 120 and a pair of panel wheels 122. Panel frame 120 includes rows of cross members 61 and endmost uprights 124. The pair of panel wheels 122 are configured to support the panel frame 120 above the ground and roll across the ground to permit swinging movement of the wheeled corral panel. Adjacent pairs of corral panels 38 are each removably pivotally attached to one another by a panel pivot joint (see FIG. 12) that permits relative swinging movement between the adjacent corral panels 38. Additional preferred details of the panel pivot joint are disclosed by U.S. Publication No. 2008/0296548, entitled PANEL CONNECTION SYSTEM, which is hereby incorporated in its entirety by reference herein However, it is within the scope of at least certain aspects of the present invention for one or more pairs of adjacent panels to be alternatively shiftably attached relative to one another.

The panel frame 120 defines an upright panel axis A1 (see FIG. 13). Panel wheels 122 each define a panel wheel axis A2, with the panel wheels 122 being axially offset from the upright panel axis A1 to opposite sides of the respective panel 38.

The corral panel 38 also includes wheel brackets 126 that depend from the panel frame 120 to rotatably support respective panel wheels 122. Wheel brackets 126 cooperatively define an oblique offset angle α therebetween. The offset angle α preferably ranges from about forty-five degrees(45°) to about ninety degrees (90°).

The opposed sets 36,40 of corral panels 38 each present a plurality of corral panels 38 on respective sides of the spine 46. Each such plurality of corral panels 38, which are stacked to one side of the spine 46 in the stored condition, preferably ranges in number from about ten (10) corral panels to about eighteen (18) corral panels. In the depicted embodiment, each plurality of corral panels 38 includes twelve (12) corral panels, with each set 36,40 having six (6) corral panels.

In alternative embodiments, it will be appreciated that one or both of the inboard and outboard sets may have an alternative number of corral panels. Although the inboard and outboard sets may include the same number of corral panels, the inboard and outboard sets may have different numbers of corral panels within the ambit of the present invention. For at least certain aspects of the present invention, the corral may have only a single set of corral panels on one side of the corral frame.

The sets 36,40 of corral panels 38 are positioned to extend longitudinally along respective sides of the spine 46 in a stored condition (see FIGS. 1-3, 9, and 10). Corral frame 42 is configured to removably support the sets 36,40 of corral panels 38 when the corral 30 is advanced in the forward direction F by the vehicle.

Figure 5:
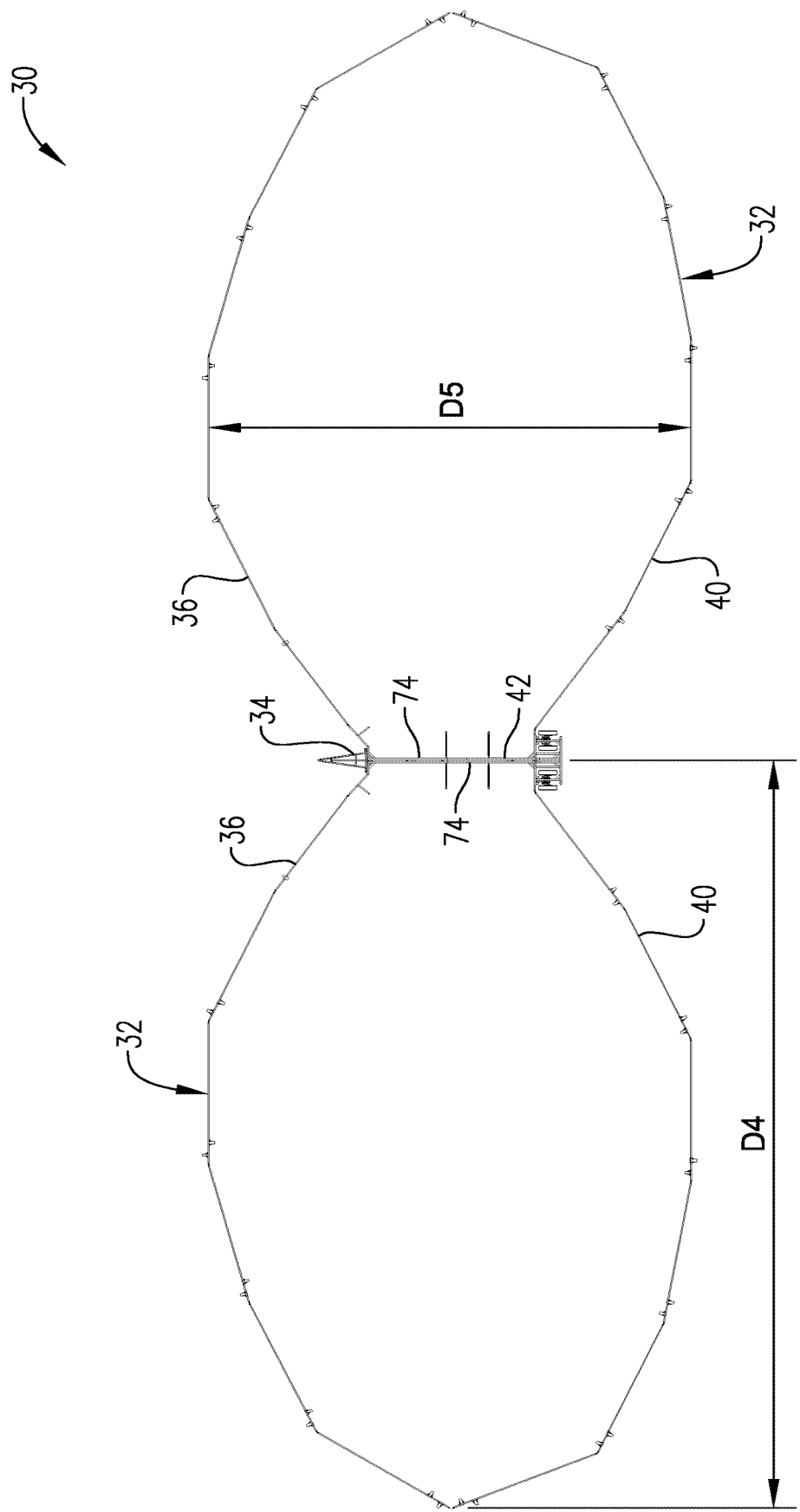
FIG. 5 is a top view of the portable livestock corral similar to FIG. 4, but showing the inboard and outboard sets of corral panels extended into a deployed condition in which the corral forms two side-by-side corral pens.
Figure 6:
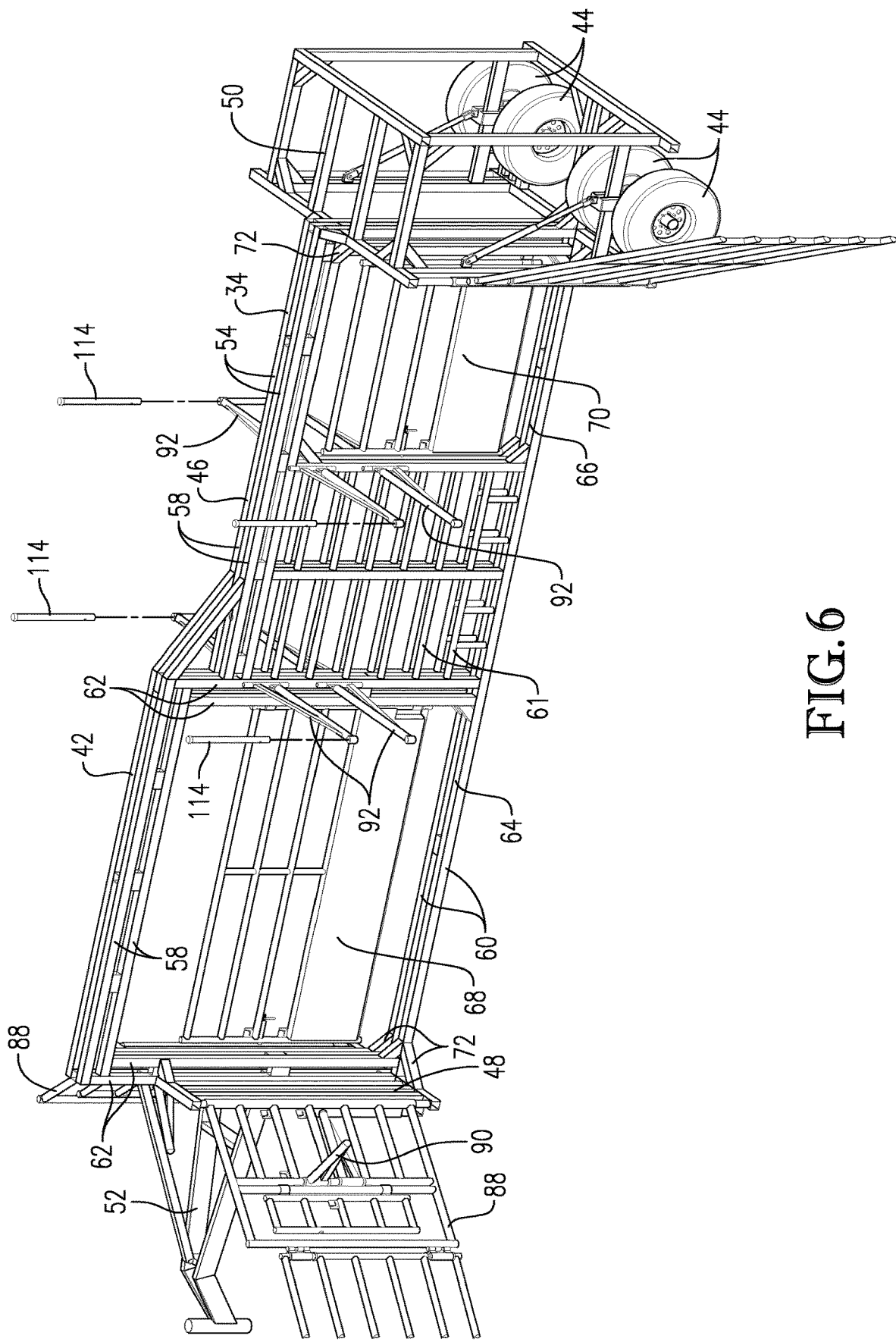
FIG. 6 is a fragmentary perspective view of the portable livestock corral shown in FIGS. 1-5, showing the corral panels removed from the wheeled chassis, with the wheeled chassis including a corral frame, start panels, and corral frame gates.
Figure 7:
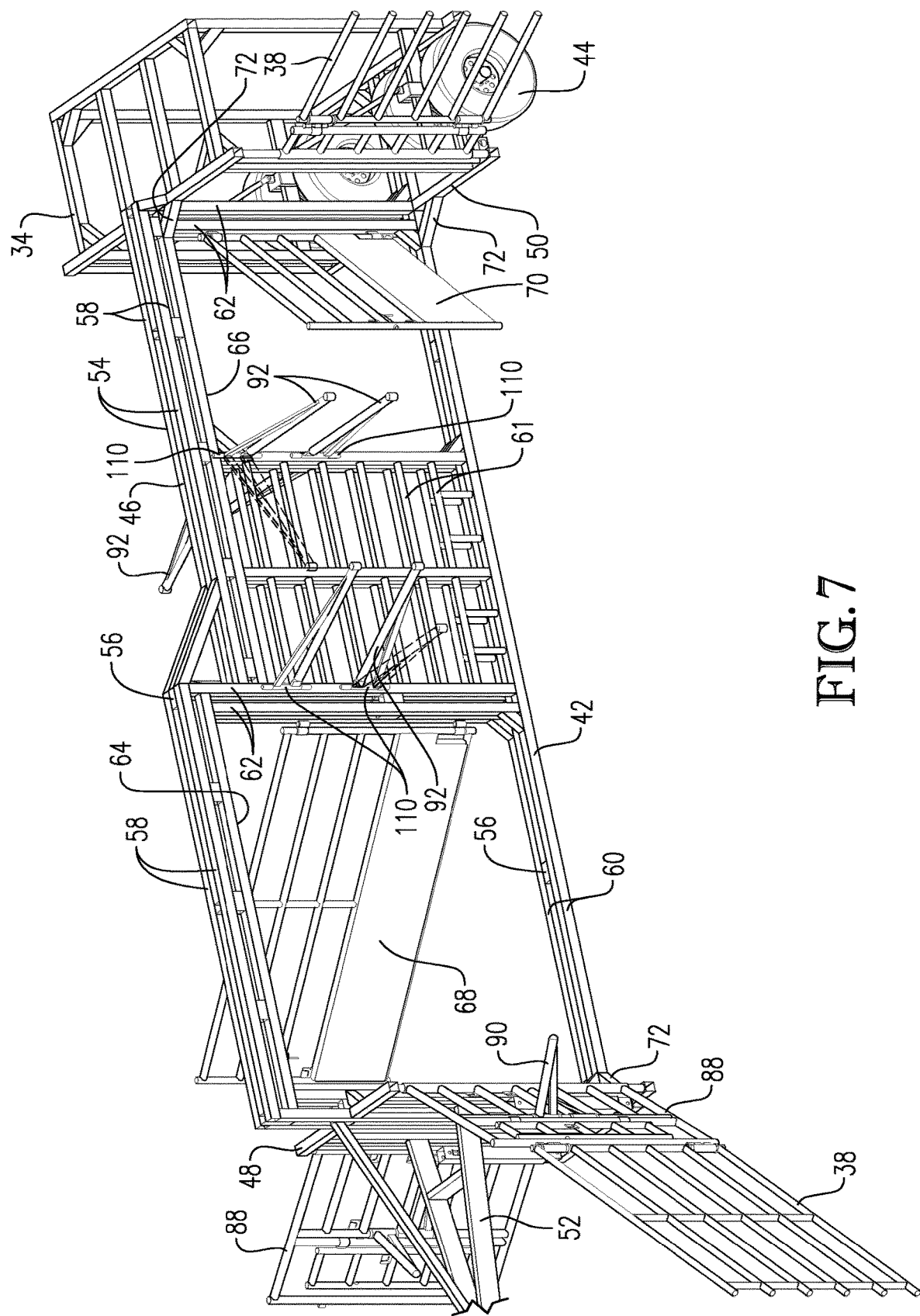
FIG. 7 is a fragmentary perspective view of the portable livestock corral similar to FIG. 6, but showing the corral frame gates opened.
Figure 8:
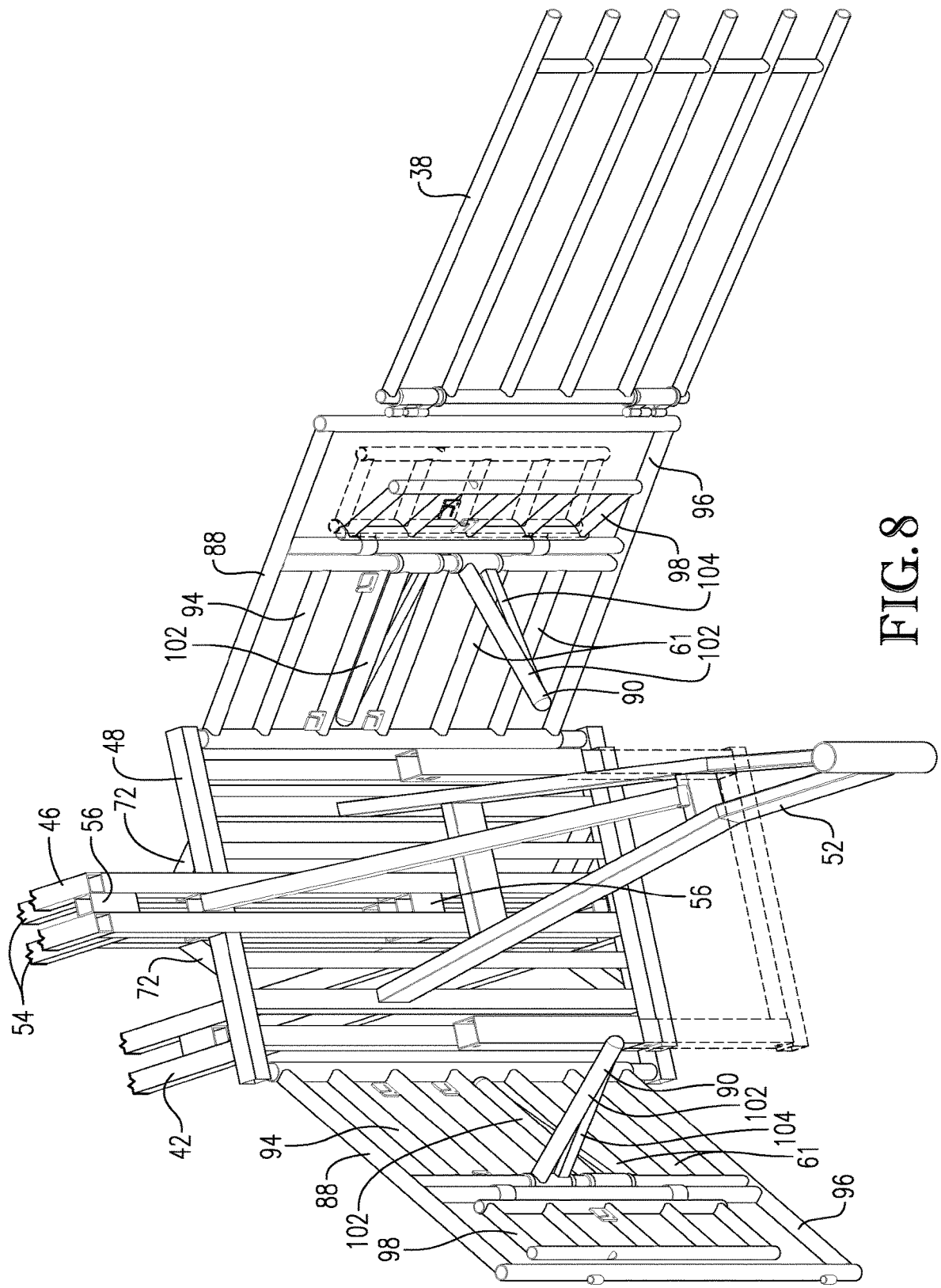
FIG. 8 is a fragmentary front perspective view of the portable livestock corral shown in FIGS. 1-7.

The sets 36,40 of corral panels 38 are each shiftable between the stored condition, in which each set 36,40 is supported at least partly within a respective storage area 74 by the wheeled chassis 34 for transport therewith, and a deployed condition (e.g., see FIG. 5). One or more corral panels 38 of sets 36,40 may be deployed to extend outside of the respective storage area 74 to form one or more enclosed livestock pens 32 (see FIG. 5). Each set 36,40 has six (6) corral panels 38 that may be extended laterally to form pens of various sizes and configurations.

In the depicted embodiment, pens 32 are generally oval-shaped and present a pen length dimension D4 and a pen width dimension D5. However, it will be appreciated that an alternative pen configuration may be provided without departing from the scope of the present invention.

Preferably, the pen length dimension D4 ranges from about fifty feet (50') to about one hundred fifty feet (150') and, more preferably, is about one hundred thirty-five feet (135'). Pen width dimension D5 preferably ranges from about fifty feet (50') to about one hundred fifty feet (150') and, more preferably, is about one hundred ten feet (110'). It is also within the ambit of certain aspects of the present invention for the pen length dimension and/or pen width dimension to fall outside of the exemplary dimensions listed above.

The sets 36,40 of corral panels 38 are pivotally attached to respective forward and aft sections 48,50 to permit convenient panel deployment and storage. In one or more embodiments, the inboard sets 36 are pivotally attached to the forward sections 48, while the outboard sets 40 are pivotally attached to the aft sections 50. Preferably, inboard and outboard sets 36,40 are pivotally attached adjacent to respective ones of the outboard margins 76.

Alternative corral embodiments may have sets alternatively attached relative to the corral frame 42. For instance, inboard sets may be pivotally attached to the aft section, while the outboard sets may be pivotally attached to the forward section. It is also within the ambit of certain aspects of the present invention for one or more sets to be attached to another part of the corral frame, such as the spine. Again, the inboard and outboard sets are preferably shiftable into and out of at least partial registration with one another in the stored condition.

The depicted portable livestock corral 30 defines a maximum corral width dimension D6 associated with the corral 30 in the stored condition (see FIG. 10). As noted previously, spine 46 preferably defines a maximum spine width dimension D1. The maximum corral width dimension D6 is preferably greater than about one hundred inches (100"). In one or more embodiments, the maximum corral width dimension D6 ranges from about one hundred inches (100") to about one hundred two inches (102"). Also, a ratio of maximum spine width dimension D1 to maximum corral width dimension D6 is preferably less than about 1:5 and, more preferably, is less than about 1:10.

Each of said plurality of corral panels on respective sides of the spine 46 define a corresponding folded panel width dimension D7 associated with the corral 30 in the stored condition (see FIG. 10). The folded panel width dimension D7 preferably ranges from about twenty-four inches (24") to about sixty inches (60") and, more preferably, ranges from about thirty-six inches (36") to about forty-eight inches (48"). A ratio of maximum spine width dimension to folded panel width dimension preferably ranges from 1:4 to about 1:10. Embodiments of the corral may have dimensions outside of the above-listed ranges, consistent with the scope of certain aspects of the present invention.

Turning to FIGS. 2 and 14-16, suspension 82 is configured to shiftably support the spindles 80 and transport wheels 44 relative to the corral frame 42. As noted above, suspension 82 includes torsion assemblies 84 with pivotal torsion arms 86 attached relative to the spindles 80. As will be described further, the suspension 82 is preferably devoid of any axle extending from one of the spindles 80 to another one of the spindles 80.

Suspension also preferably includes elongated swing arms 130 that shiftably support the respective torsion assemblies 84. The swing arm 130 includes a forward end 132 attached to the corral frame 42 at a swing arm pivot joint 134 that permits swinging up-and-down movement of the swing arm 130 and transport wheels 44 between lowered and raised positions.

The illustrated suspension 82 also includes powered motors 136 attached to and extending between the corresponding swing arms 130 and the corral frame 42. The powered motor 136 preferably comprises a hydraulic cylinder with a cylinder body and piston slidable into and out of the cylinder body. The hydraulic cylinder is configured to drive the swing arm 130 between the lowered and raised positions.

The piston of motor 136 is pivotally attached to a U-shaped bracket 138 of the swing arm 130. The bracket 138 is configured slidably receive a brace 139 as the swing arm 130 moves between lowered and raised positions. The brace is operable to engage the bracket 138 to restrict lowering of the swing arm 130 below the lowered position.

The suspension 82 is preferably configured so that each pair of transport wheels 44 is shiftable independently of the other pair of transport wheels 44, relative to the corral frame 42, and is operable to support the corral frame 42 above the ground. Furthermore, the suspension 82 is preferably devoid of any axle extending from one pair of spindles 80 to the other pair of spindles 80.

Again, part of each torsion assembly 84 is configured to resiliently flex to permit shifting of the torsion arms 86 and the transport wheels 44. In particular, each torsion assembly 84 preferably includes torsion arms 86, torsion housings 140, and elastomeric elements 142 (see FIG. 15a).

Torsion housing 140 has a generally square-shaped sidewall 144 and presents a socket 146 to receive the torsion arm 86 and elastomeric elements 142. The torsion arm 86 includes a torsion bar 148 with a generally square cross-sectional profile. The torsion arm 86 is positioned so that the torsion bar 148 extends into the socket 146.

Elastomeric elements 142 preferably comprise an elastomeric material (such as a rubber or nitrile material). Elastomeric elements 142 are located between the torsion bar 148 and sidewall 144 and engage the torsion bar 148 to restrict relative pivoting between the torsion bar 148 and the torsion housing 140. The elastomeric elements 142 generally operate as springs so that as the torsion bar 148 (and torsion arm 86) is rotated out of a relaxed condition, the elements 142 cooperatively urge the torsion bar 148 (and torsion arm 86) to return to the relaxed condition. It will also be appreciated that elastomeric elements 142 may provide at least some damping of torsion bar and torsion arm rotation.

Thus, the torsion arms 86 are attached relative to the corral frame at torsion arm pivot joints 150. The spindles 80 are supported by respective ones of the torsion arms 86 rearwardly of the torsion arm pivot joints 150. Consequently, the suspension 82 is preferably devoid of any axle extending from one spindle 80 supported by the torsion assembly 84 to the other spindle 80 supported by the torsion assembly 84.

For certain aspects of the present invention, the suspension may be alternatively configured, as will be shown in subsequent embodiments. For instance, an alternative suspension may have spindles supported by the same torsion assembly and interconnected by an axle (e.g. spindles integrally formed as part of an axle).

Figure 17:
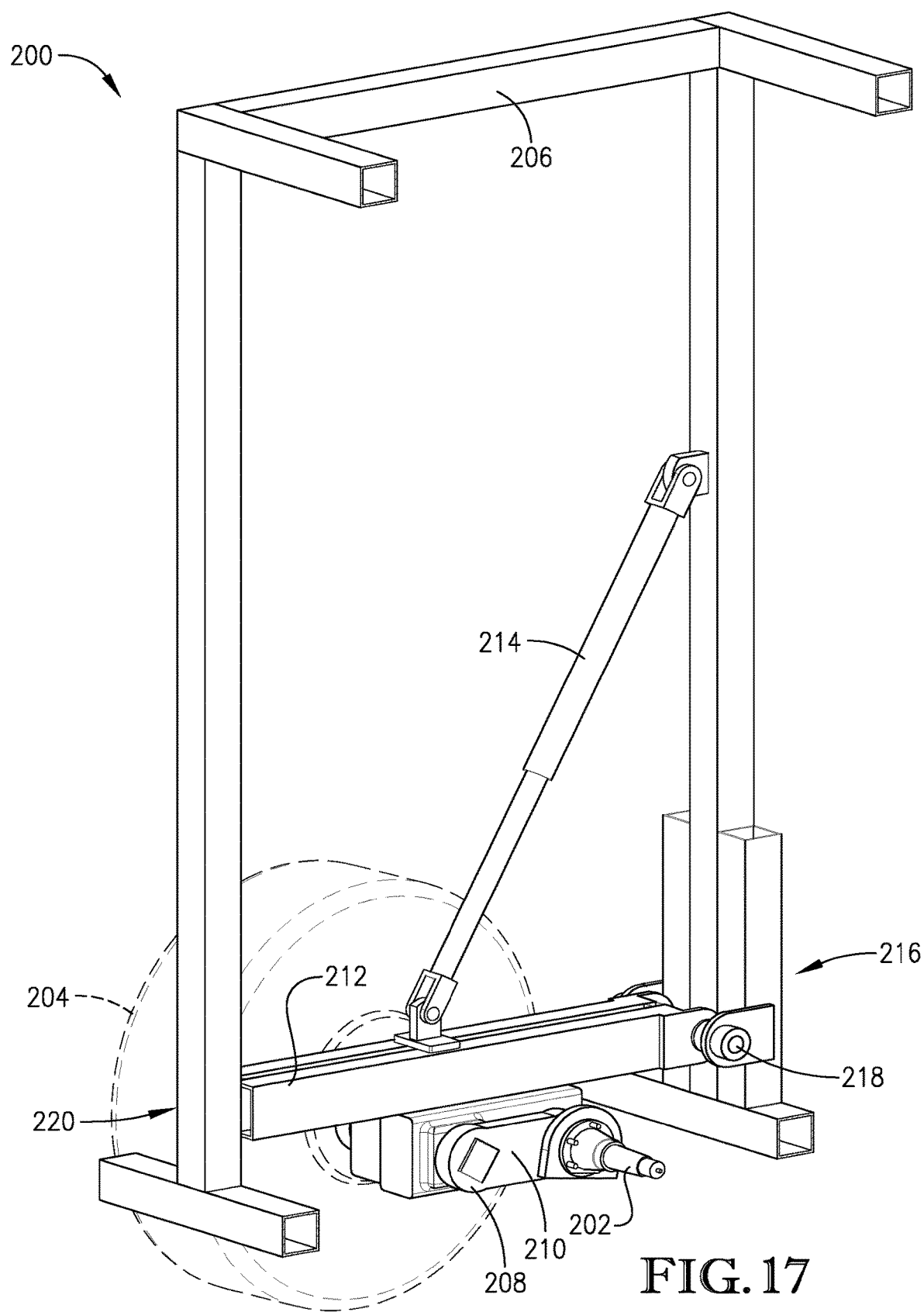
FIGS. 17-19 are fragmentary perspective views of a portable livestock corral constructed in accordance with a second preferred embodiment of the present invention, and depicting an alternative suspension that adjustably supports an aft section of the corral frame.
Figure 18:
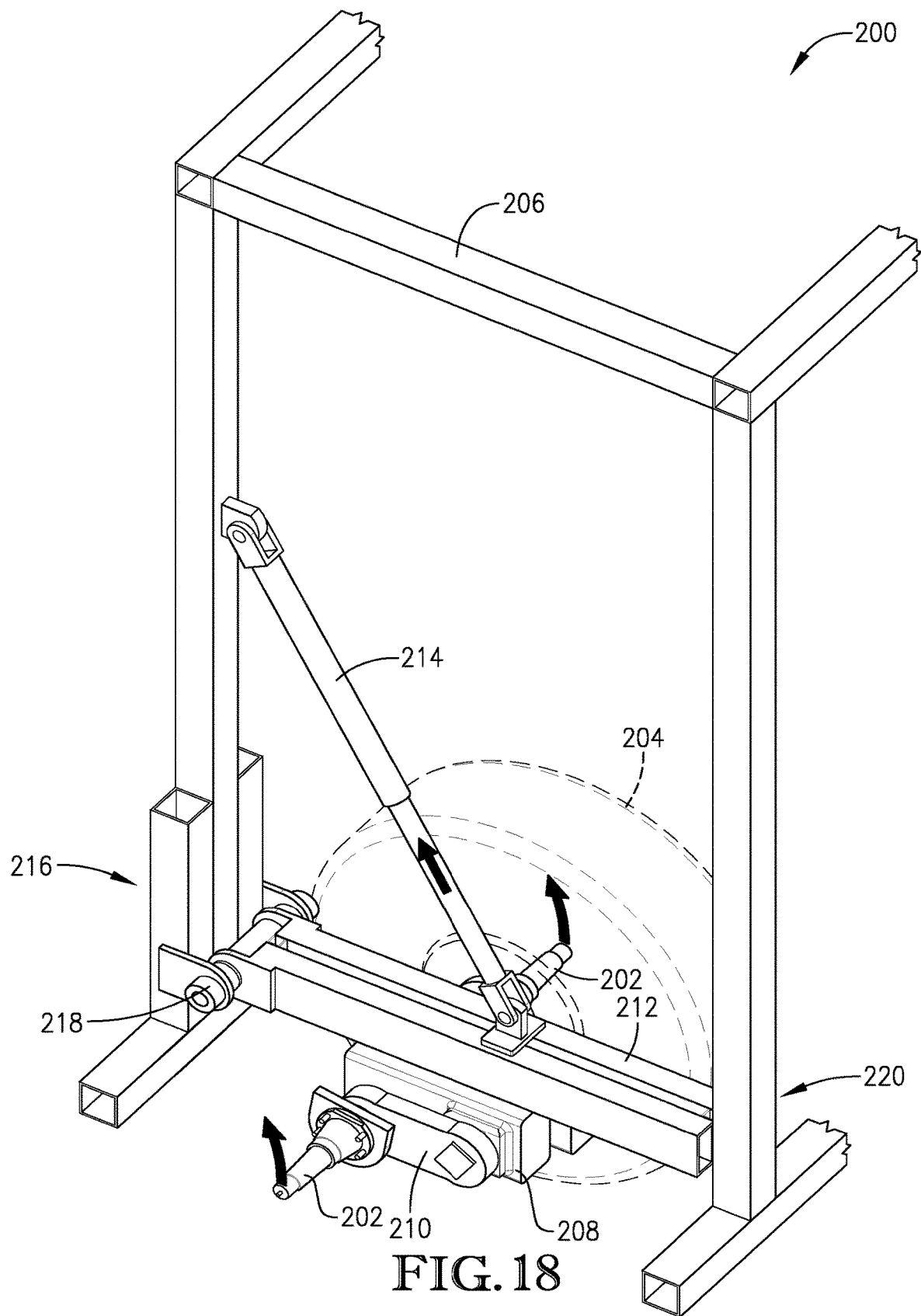
Figure 19:
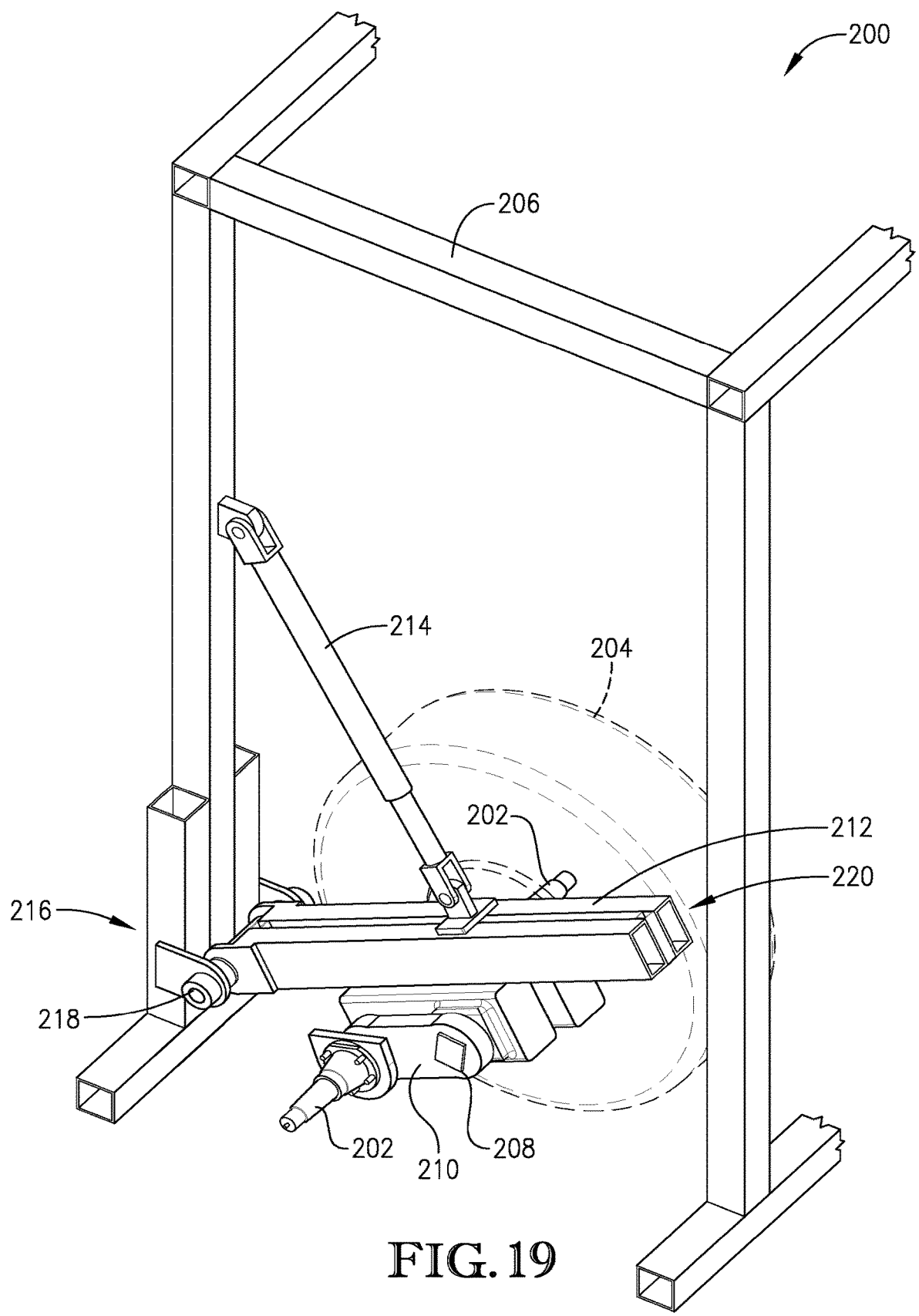

Turning to FIGS. 17-19, an alternative suspension 200 is constructed in accordance with a second preferred embodiment of the present invention. Suspension 200 is configured to shiftably support spindles 202 and transport wheels 204 relative to a corral frame 206. Suspension 200 includes a pair of torsion assemblies 208 each including pivotal torsion arms 210.

Suspension 200 also preferably includes elongated swing arms 212 and motors 214 that shiftably support the respective torsion assemblies 208. The swing arm 212 includes a forward end 216 attached to the corral frame 206 at a swing arm pivot joint 218 that permits swinging up-and-down movement of the swing arm 212 and transport wheels 204.

Swing arm 212 comprises a rigid tubular structure that presents an aft end 220, which is preferably removably latched into engagement with a portion of the corral frame 206. The suspension 200 includes a latching device (not shown) mounted on an upright of the corral frame 206 adjacent the aft end 220.

Turning to FIGS. 20-23, an alternative suspension 300 is constructed in accordance with a third preferred embodiment of the present invention.

Suspension 300 is configured to shiftably support spindles 302 and transport wheels 304 relative to a corral frame 306. Suspension 300 includes a pair of torsion assemblies 308 associated with respective pairs of transport wheels 304. Each torsion assembly 308 includes a pivotal torsion arm 310.

The torsion arms 310 each preferably comprise a unitary torsion arm attached to a bracket 312 at a torsion arm pivot joint 314. Each pair of spindles 302 is preferably supported by the unitary torsion arm 310 rearwardly of the torsion arm pivot joint 314. Preferably, torsion assembly 308 also includes a unitary elastomeric element 316 engaged with the unitary torsion arm 310 and the bracket 312.

The elastomeric element 316 generally comprises a unitary spring. As the torsion bar is rotated out of a relaxed condition, the element 316 urges the torsion arm 310 to return to the relaxed condition. It will also be appreciated that elastomeric element 310 may provide at least some damping of torsion arm rotation.

Although the present description references upward and downward directions, as well as forward and aft directions, it will be appreciated that the present invention broadly covers various positions, orientations, and movements of corral components.

In one or more embodiments, the corral frame, panels, and other rigid components of the portable corral system are preferably formed of a metal material, such as steel or carbon steel. However, it is within the scope of the present invention for one or more components to include an alternative metal (such as stainless steel, aluminum, etc.), alloys thereof, or a non-metal material (such as a synthetic resin). Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein. As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

Although the above description presents features of exemplary embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description. The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

The invention claimed is:

1. A portable panel assembly configured to be operably attached to a vehicle for advancement in a forward direction, said portable panel assembly comprising:
a wheeled chassis including an elongated frame and a ground-engaging transport wheel operable to support the frame above ground,
said frame including a spine extending longitudinally along the forward direction to receive corresponding panels; and
panels positioned to extend longitudinally along at least one side of the spine in a stored condition, with the frame configured to support the panels in the stored condition and when the portable panel assembly is advanced in the forward direction by the vehicle,
said spine including side-by-side structural walls, a first set of spacers, and a second set of spacers, with the side-by-side structural walls spaced laterally from each other by the first set of spacers and the second set of spacers and extending longitudinally along a length of the spine,
each of said side-by-side structural walls including a first tubular beam and a second tubular beam arranged vertically relative to each other and extending longitudinally,
said first tubular beams of the side-by-side structural walls being fixed relative to each other by the first set of spacers positioned along the length of the spine,
said second tubular beams of the side-by-side structural walls being fixed relative to each other by the second set of spacers positioned along the length of the spine.

2. The portable panel assembly as claimed in claim 1, each of said side-by-side structural walls including a third set of spacers positioned along the length of the spine, with the first tubular beam and the second tubular beam of the side-by-side structural wall being vertically spaced and fixed relative to each other by the third set of spacers.

3. The portable panel assembly as claimed in claim 1, said first tubular beam and said second tubular beam of each side-by-side structural wall being vertically spaced and fixed relative to each other by a third set of spacers positioned along the length of the spine.

4. The portable panel assembly as claimed in claim 3, each of said side-by-side structural walls including a third tubular beam spaced below the first tubular beam and the second tubular beam,
said side-by-side structural walls cooperatively defining an opening between the first tubular beams and the third tubular beams that permits user movement from one side of the spine to the other side of the spine.

5. The portable panel assembly as claimed in claim 1, said panels comprising opposed sets of panels, with each of said opposed sets of panels including a series of panels pivotally attached to one another in series and configured to be folded into and out of at least partial registration with one another.

6. The portable panel assembly as claimed in claim 5, said frame including spaced apart forward and aft sections connected relative to each other by the spine.

7. The portable panel assembly as claimed in claim 6, each of said opposed sets of panels pivotally attached to one of the forward and aft sections.

8. The portable panel assembly as claimed in claim 6, said opposed sets of panels including an inboard set of panels pivotally attached to one of the forward and aft sections and an outboard set of panels pivotally attached to the other of the forward and aft sections.

9. The portable panel assembly as claimed in claim 8, said inboard set of panels being pivotally attached to the forward section and the outboard set of panels being pivotally attached to the aft section.

10. The portable panel assembly as claimed in claim 8, said inboard set of panels and said outboard set of panels being shiftable into and out of at least partial registration with one another in the stored condition.

11. The portable panel assembly as claimed in claim 8, said forward and aft sections each extending outboard of the spine in opposite lateral directions so that the spine and the forward and aft sections cooperatively define opposed storage areas.

12. The portable panel assembly as claimed in claim 11, said forward and aft sections each presenting opposite outboard margins, with the inboard and outboard sets pivotally attached adjacent to respective ones of the outboard margins.

13. The portable panel assembly as claimed in claim 1, said panels comprising opposed sets of panels, with the opposed sets of panels each presenting a plurality of panels on respective sides of the spine, with each plurality of panels ranging from about ten panels to about eighteen panels, stacked alongside one another in the stored condition.

14. The portable panel assembly as claimed in claim 13, said opposed sets of panels each including a series of panels pivotally attached to one another in series and configured to be folded into and out of at least partial registration with one another.

15. The portable panel assembly as claimed in claim 1, said portable panel assembly defining a maximum stored width dimension in the stored condition and said spine defining a maximum spine width dimension, with a ratio of maximum spine width dimension to maximum stored width dimension being less than about 1:5.

16. The portable panel assembly as claimed in claim 15, said maximum stored width dimension being greater than about one hundred inches.

17. The portable panel assembly as claimed in claim 15, said spine defining a maximum spine width dimension that is less than about twelve inches.

18. The portable panel assembly as claimed in claim 15, said panels comprising opposed sets of panels, with the opposed sets of panels presenting a plurality of panels on respective sides of the spine, each of said plurality of panels on respective sides of the spine defining a corresponding folded panel width dimension, with a ratio of maximum spine width dimension to folded panel width dimension ranging from 1:4 to about 1:10.

19. The portable panel assembly as claimed in claim 18, each of said plurality of panels ranging from about ten panels to about eighteen panels, stacked alongside one another in the stored condition.

20. The portable panel assembly as claimed in claim 1, said panels defining a panel length dimension that is at least about eighteen feet.

\* \* \* \* \*